(12) United States Patent
Saotome et al.

(10) Patent No.: US 12,139,112 B2
(45) Date of Patent: Nov. 12, 2024

(54) BRAKE SYSTEM, BRAKING FORCE DISTRIBUTION APPARATUS, AND ELECTRIC BRAKE APPARATUS

(71) Applicant: Hitachi Astemo, Ltd., Ibaraki (JP)

(72) Inventors: Suguru Saotome, Hitachinaka (JP); Norikazu Matsuzaki, Hitachinaka (JP); Masayuki Kikawa, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 414 days.

(21) Appl. No.: 17/439,264

(22) PCT Filed: May 26, 2020

(86) PCT No.: PCT/JP2020/020743
§ 371 (c)(1),
(2) Date: Mar. 30, 2022

(87) PCT Pub. No.: WO2020/241637
PCT Pub. Date: Dec. 3, 2020

(65) Prior Publication Data
US 2023/0174036 A1 Jun. 8, 2023

(30) Foreign Application Priority Data
May 28, 2019 (JP) .................................. 2019-099437

(51) Int. Cl.
*B60T 13/14* (2006.01)
*B60T 7/12* (2006.01)
(Continued)

(52) U.S. Cl.
CPC ........ *B60T 13/147* (2013.01); *B60T 8/17616* (2013.01); *B60T 13/58* (2013.01);
(Continued)

(58) Field of Classification Search
CPC .... B60T 13/147; B60T 8/17616; B60T 13/58; B60T 13/741; B60T 13/745; B60T 7/12;
(Continued)

(56) References Cited

U.S. PATENT DOCUMENTS

2015/0061365 A1* 3/2015 Sakashita .............. B60T 13/588
303/15
2018/0065611 A1 3/2018 Matsuura

FOREIGN PATENT DOCUMENTS

JP 2007-15553 1/2007
JP 2010-81720 4/2010
(Continued)

OTHER PUBLICATIONS

International Search Report issued Aug. 4, 2020 in corresponding International Application No. PCT/JP2020/020743, with English language translation.
(Continued)

Primary Examiner — Jacob M Amick
(74) Attorney, Agent, or Firm — Wenderoth, Lind & Ponack, L.L.P.

(57) ABSTRACT

An ESC 33 increases distribution of a braking force to rear wheels according to a reduction in a speed of a vehicle due to braking, and distributes the braking force so as to allow the vehicle to be kept stopped due to braking forces applied to the rear wheels when the vehicle stopped. Then, a second ECU holds the braking force by driving a parking mechanism with the vehicle kept stopped due to the braking forces applied to the rear wheels.

12 Claims, 8 Drawing Sheets

(51) Int. Cl.
*B60T 8/17* (2006.01)
*B60T 8/1761* (2006.01)
*B60T 13/58* (2006.01)
*B60T 13/74* (2006.01)
*B60T 8/1755* (2006.01)

(52) U.S. Cl.
CPC .......... *B60T 13/741* (2013.01); *B60T 13/745* (2013.01); *B60T 7/12* (2013.01); *B60T 8/1755* (2013.01); *B60T 2201/06* (2013.01); *B60T 2270/10* (2013.01); *B60T 2270/30* (2013.01)

(58) Field of Classification Search
CPC ............... B60T 8/1755; B60T 2201/06; B60T 2270/10; B60T 2270/30
See application file for complete search history.

(56) References Cited

FOREIGN PATENT DOCUMENTS

| | | |
|---|---|---|
| JP | 2014-136441 | 7/2014 |
| JP | 2016-190516 | 11/2016 |
| KR | 10-2017-0132723 | 12/2017 |

OTHER PUBLICATIONS

Written Opinion of the International Searching Authority issued Aug. 4, 2020 in corresponding International Application No. PCT/JP2020/020743, with English language translation.
Office Action issued Dec. 12, 2022 in corresponding Korean Patent Application No. 10-2021-7021296, with English translation.

* cited by examiner

BRAKE SYSTEM, BRAKING FORCE DISTRIBUTION APPARATUS, AND ELECTRIC BRAKE APPARATUS

TECHNICAL FIELD

The present invention relates to a brake system, a braking force distribution apparatus, and an electric brake apparatus that apply a braking force to a vehicle such as an automobile.

BACKGROUND ART

For example, PTL 1 discusses a technique that releases braking forces on front wheels according to pitching immediately after a vehicle is stopped, thereby reducing an unconformable feeling due to a change in the posture when the brakes on the four wheels are released immediately after the parking brake is actuated. On the other hand, PTL 2 discusses a technique that limits driving forces on rear wheels according to a maximum driving force of the two rear wheels that is calculated with use of a friction circle, thereby reducing a disturbance of the behavior of the vehicle due to a slip of the rear wheels.

CITATION LIST

Patent Literature

PTL 1: Japanese Patent Application Public Disclosure No. 2007-15553
PTL 2: Japanese Patent Application Public Disclosure No. 2010-81720

SUMMARY OF INVENTION

Technical Problem

The technique discussed in PTL 1 reduces the uncomfortable feeling based on the assumption that the pitching occurs on the vehicle when the vehicle is stopped. Therefore, this technique may fail to reduce the uncomfortable feeling accompanying the release of the braking forces on the front wheels if the vehicle is slowly stopped so as not to cause the pitching. On the other hand, when limiting the driving forces on the rear wheels, the technique discussed in PTL 2 does not perform control of compensating for these limited driving forces by the two front wheels. Therefore, if reviewing this technique while replacing the driving force with a frictional force, the total braking force is supposed to reduce during braking, and the behavior of the vehicle may be disturbed.

An object of the present invention is to provide a brake system, a braking force distribution apparatus, and an electric brake apparatus capable of reducing a change in the posture of a vehicle.

Solution to Problem

According to one aspect of the present invention, a brake system includes a braking force distribution apparatus configured to distribute a braking force to apply to a braking force holding wheel and a non-braking force holding wheel of a vehicle. The vehicle includes the braking force holding wheel including a braking force holding mechanism configured to hold a braking force on the vehicle, and the non-braking force holding wheel not including this braking force holding mechanism. The brake system further includes a parking brake control apparatus configured to control actuation of the braking force holding mechanism. The braking force distribution apparatus increases distribution of the braking force to the braking force holding wheel according to a reduction in a speed of the vehicle due to braking, and distributes the braking force so as to allow the vehicle to be kept stopped due to the braking force applied to the braking force holding wheel when the vehicle is stopped. The parking brake control apparatus holds the braking force with the vehicle kept stopped due to the braking force applied to the braking force holding wheel.

Further, according to one aspect of the present invention, a braking force distribution apparatus is configured to distribute a braking force to apply to a braking force holding wheel and a non-braking force holding wheel of a vehicle. The vehicle includes the braking force holding wheel including a braking force holding mechanism configured to hold a braking force on the vehicle, and the non-braking force holding wheel not including this braking force holding mechanism. The braking force distribution apparatus is configured to increase distribution of the braking force to the braking force holding wheel according to a reduction in a speed of the vehicle due to braking, and distribute the braking force so as to allow the vehicle to be kept stopped due to the braking force applied to the braking force holding wheel when the vehicle is stopped.

Further, according to one aspect of the present invention, an electric brake apparatus includes an electric motor configured to drive a braking force holding mechanism configured to hold a braking force on a vehicle, and a control apparatus configured to control driving of the electric motor. The control apparatus holds the braking force by driving the electric motor with the braking force distributed only to a wheel including the braking force holding mechanism.

Advantageous Effects of Invention

According to the aspects of the present invention, the change in the posture of the vehicle can be reduced.

DESCRIPTION OF EMBODIMENTS

In the following description, a brake system, a braking force distribution apparatus, and an electric brake apparatus according to an embodiment will be described citing an example in which they are mounted on a four-wheeled automobile with reference to the accompanying drawings. Each of steps in flowcharts illustrated in FIGS. 4, 6, and 7 will be represented by the symbol "S" (for example, assume that "S1" represents step 1).

Figure 1:
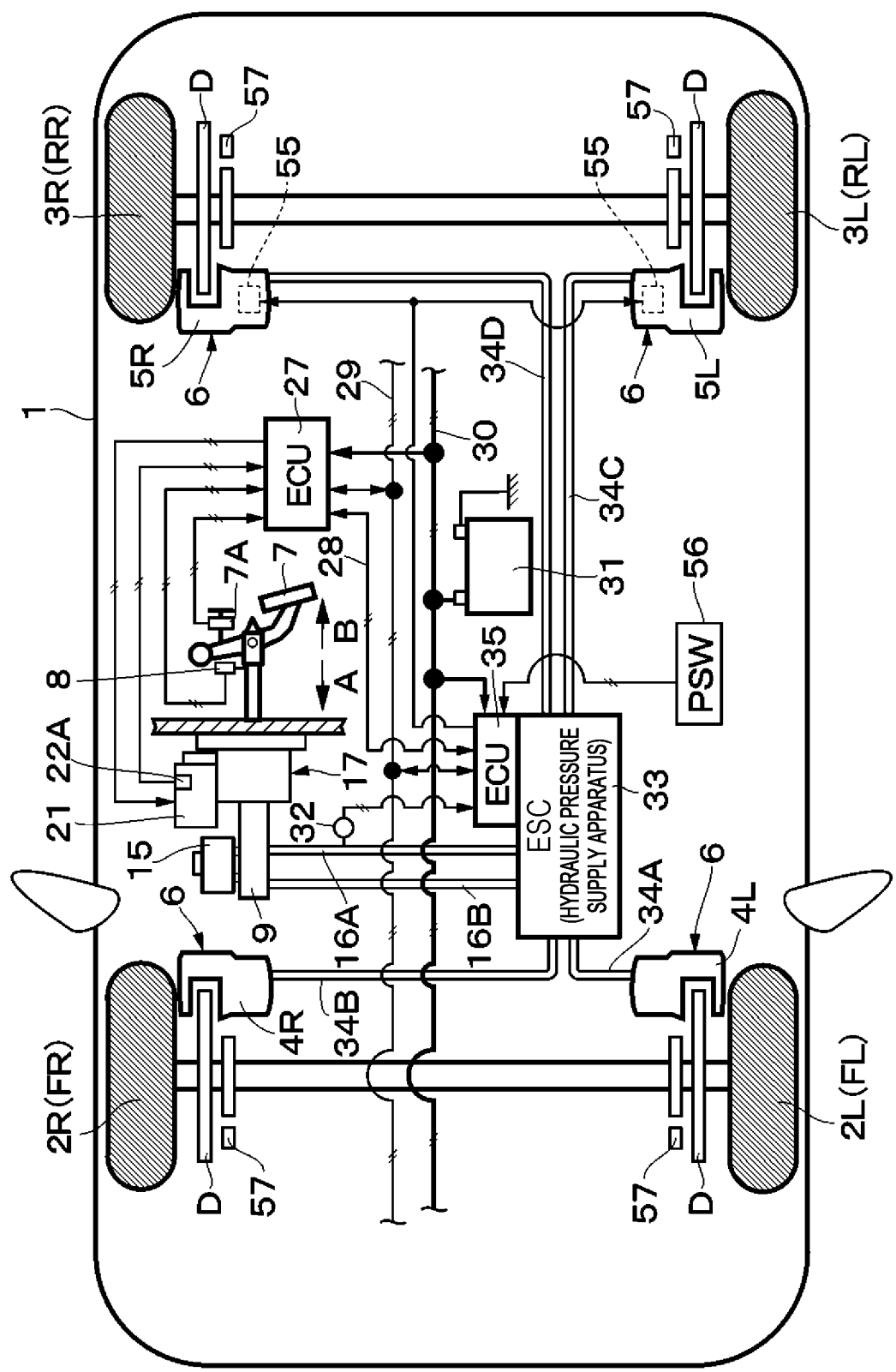
FIG. 1 schematically illustrates a vehicle on which a brake system, a braking force distribution apparatus, and an electric brake apparatus according to an embodiment are mounted.

In FIG. 1, for example, front left and right wheels 2L and 2R and rear left and right wheels 3L and 3R are mounted under (on the road surface side of) a vehicle body 1 forming a main structure of a vehicle. Front wheel-side wheel cylinders 4L and 4R are mounted on the front left and right wheels 2L and 2R, respectively. Rear wheel-side wheel cylinders 5L and 5R are mounted on the rear left and right wheels 3L and 3R, respectively. Each of the front wheel-side cylinders 4L and 4R forms, for example, a hydraulic disk brake. Each of the rear wheel-side cylinders 5L and 5R forms, for example, a hydraulic disk brake equipped with an electric parking brake function.

The wheel cylinders 4L, 4R, 5L, and 5R each apply a braking force for each of the respective wheels (the front wheels 2L and 2R and the rear wheels 3L and 3R). Each of the wheel cylinders 4L, 4R, 5L, and 5R forms a frictional braking apparatus 6 serving as a disk brake together with pads movable by receiving a hydraulic pressure. The frictional braking apparatus 6 may be formed by a drum brake in which shoes are movable by receiving the hydraulic pressure. The frictional braking apparatus 6 is provided on each of the wheels 2L, 2R, 3L, and 3R. The frictional braking apparatus 6 presses a frictional lining (the pads or the shoes) against a rotational member D (the disk or the drum) rotating together with the wheel 2L, 2R, 3L, or 3R by the wheel cylinder 4L, 4R, 5L, or 5R. As a result, the frictional braking apparatus 6 can brake the vehicle based on friction between the frictional lining and the rotational member D. As will be described below, the frictional braking apparatus 6 on the rear wheel side includes a parking mechanism 55 as a braking force holding mechanism that holds the braking force on the vehicle. Further, a wheel speed sensor 57 is provided near each of the front wheels 2L and 2R and the rear wheels 3L and 3R.

A brake pedal 7 is provided on the dashboard side of the vehicle body 1. The brake pedal 7 is operated by being pressed by a driver (an operator) in a direction indicated by an arrow A in FIGS. 1 and 2 at the time of an operation of braking the vehicle. A brake switch 7A and an operation amount detection sensor 8 are provided on the brake pedal 7. The brake switch 7A detects whether there is the operation of braking the vehicle, and, for example, turns on and off a brake lamp (not illustrated). The operation amount detection sensor 8 detects an operation amount (a stroke amount) or a pressing force of the operation of pressing the brake pedal 7, and outputs a detection signal thereof to, for example, a first ECU 27, a second ECU 35, and a vehicle data bus 29, which will be described below. When the brake pedal 7 is operated by being pressed, a brake hydraulic pressure is generated in a master cylinder 9 via an electric boosting apparatus 17, which will be described below.

Figure 2:
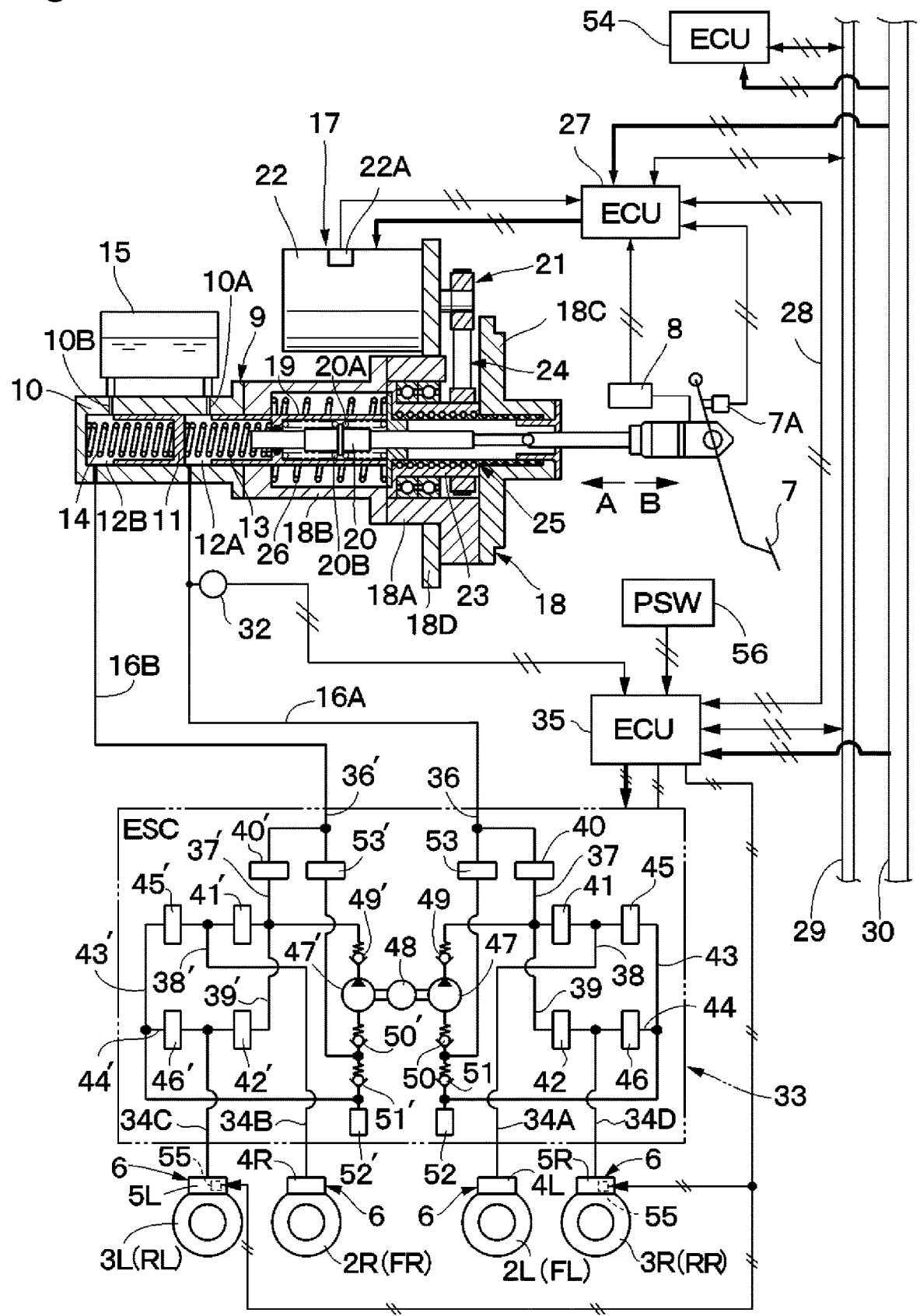
FIG. 2 illustrates the configurations of an electric boosting apparatus, an ESC (a hydraulic pressure supply apparatus), and the like illustrated in FIG. 1.

As illustrated in FIG. 2, the master cylinder 9 includes a bottomed cylindrical cylinder main body 10 having one side formed as an opening end and the opposite side formed as a bottom portion and closed. First and second supply ports 10A and 10B in communication with inside a reservoir 15, which will be described below, are provided on the cylinder main body 10. The first supply port 10A is brought into and out of communication with a first hydraulic pressure chamber 12A by a sliding displacement of a booster piston 19, which will be described below. The second supply port 10B is brought into and out of communication with a second hydraulic pressure chamber 12B by a second piston 11, which will be described below.

The opening end side of the cylinder main body 10 is detachably fixed to a booster housing 18 of the electric boosting apparatus 17, which will be described below, with use of a plurality of attachment bolts (not illustrated) or the like. The master cylinder 9 includes the cylinder main body 10, a first piston (the booster piston 19 and an input rod 20, which will be described below) and the second piston 11, the first hydraulic pressure chamber 12A, the second hydraulic pressure chamber 12B, a first return spring 13, and a second return spring 14. In FIG. 2, thin lines with two slash marks added on the way thereof indicate signal lines of electric circuits. Further, thick lines with two slash marks added on the way thereof indicate power source lines of the electric circuits. Thin lines without two slash marks added on the way thereof indicate hydraulic pressure pipes.

In the master cylinder 9, the first piston is formed by the booster piston 19 and the input rod 20, which will be described below. The first hydraulic pressure chamber 12A and the second hydraulic pressure chamber 12B are formed inside the cylinder main body 10 of the master cylinder 9. The first hydraulic pressure chamber 12A is defined between the second piston 11 and the booster piston 19 (and the input rod 20). The second hydraulic pressure chamber 12B is defined between the bottom portion of the cylinder main body 10 and the second piston 11.

The first return spring 13 is positioned in the first hydraulic pressure chamber 12A, and is arranged between the booster piston 19 and the second piston 11. The first return spring 13 biases the booster piston 19 toward the opening end side of the cylinder main body 10. The second return spring 14 is positioned in the second hydraulic pressure chamber 12B, and is arranged between the bottom portion of the cylinder main body 10 and the second piston 11. The second return spring 14 biases the second piston 11 toward the first hydraulic pressure chamber 12A side.

When the brake pedal 7 is operated by being pressed in the direction indicated by the arrow A, the booster piston 19 (and the input rod 20) and the second piston 11 are displaced toward the bottom portion of the cylinder main body 10 according to this pressing operation. Then, when the first and second supply ports 10A and 10B are brought out of communication due to this displacement, brake hydraulic pressures are generated in the brake fluid in the first and second hydraulic pressure chambers 12A and 12B according to the displacements of the booster piston 19 (and the input rod 20) and the second piston 11. On the other hand, when the operation on the brake pedal 7 is released, the booster piston 19 (and the input rod 20) and the second piston 11 are displaced by the first and second return springs 13 and 14 in a direction indicated by an arrow B toward the opening portion of the cylinder main body 10. At this time, the brake hydraulic pressures in the first and second hydraulic pressure chambers 12A and 12B reduce according to the displacements of the booster piston 19 (and the input rod 20) and the second piston 11, and the first and second supply ports 10A and 10B are brought into communication, by which the brake hydraulic pressures are released.

The reservoir 15 as a working fluid tank storing the brake fluid therein is connected to the cylinder main body 10 of the master cylinder 9. The reservoir 15 replenishes the brake fluid into the hydraulic pressure chambers 12A and 12B in the cylinder main body 10. More specifically, when the first supply port 10A is in communication with the first hydraulic pressure chamber 12A and the second supply port 10B is in communication with the second hydraulic pressure chamber 12B, the brake fluid can be supplied or discharged between these hydraulic pressure chambers 12A and 12B and the reservoir 15.

On the other hand, when the first supply port 10A is out of communication with the first hydraulic pressure chamber 12A due to the booster piston 19 and the second supply port 10B is out of communication with the second hydraulic pressure chamber 12B due to the second piston 11, the supply and the discharge of the brake fluid are stopped between these hydraulic pressure chambers 12A and 12B and the reservoir 15. As a result, the brake hydraulic pressures are generated according to the brake operation in the first and second hydraulic pressure chambers 12A and 12B of the master cylinder 9. These brake hydraulic pressures are, for example, supplied to a hydraulic pressure supply apparatus 33, which will be described below, via a pair of cylinder-side hydraulic pressure pipes 16A and 16B.

The electric boosting apparatus 17 as a booster for increasing the force operating the brake pedal 7 is provided between the brake pedal 7 and the master cylinder 9 of the vehicle. The electric boosting apparatus 17 variably controls the brake hydraulic pressure generated in the master cylinder 9 by controlling the driving of an electric actuator 21 (an electric motor 22 thereof), which will be described below, based on the output of the operation amount detection sensor 8.

The electric boosting apparatus 17 includes the booster housing 18, the booster piston 19, and the electric actuator 21. The booster housing 18 is provided fixedly to the front wall of a vehicle compartment, which corresponds to the dashboard of the vehicle body. The booster piston 19 serves as a piston movably provided in the booster housing 18 and displaceably relative to the input rod 20. The electric actuator 21 serves as an actuator that causes forward and rearward movements of the booster piston 19 in the axial direction of the master cylinder 9, thereby applying a booster thrust force to the booster piston 19.

The booster piston 19 is made of a cylindrical member. The booster piston 19 is axially slidably and fittedly inserted in the cylinder main body 10 of the master cylinder 9. The input rod (an input piston) 20 is slidably and fittedly inserted on the inner peripheral side of the booster piston 19. The input rod 20 serves as an input member that moves forward and rearward in the axial direction of the master cylinder 9 (i.e., the directions indicated by the arrows A and B) by being directly pushed according to the operation on the brake pedal 7. The input rod 20 forms a first piston of the master cylinder 9 together with the booster piston 19. The brake pedal 7 is coupled to the rear end portion of the input rod 20, i.e., the end portion of the input rod 20 on one axial side of the input rod 20 (the right side in FIG. 2). The first hydraulic pressure chamber 12A is defined between the second piston 11, and the booster piston 19 and the input rod 20 in the cylinder main body 10.

The booster housing 18 includes a cylindrical speed reducer casing 18A, a cylindrical support casing 18B, and a stepped and cylindrical cover member 18C. The speed reducer casing 18A contains therein, for example, a speed reduction mechanism 24, which will be described below. The support casing 18B is provided between the speed reducer casing 18A and the cylinder main body 10 of the master cylinder 9, and supports the booster piston 19 axially slidably displaceably. The cover member 18C is disposed on the axially opposite side of the speed reducer casing 18A from the support casing 18B (the one axial side), and closes an opening of the speed reducer casing 18A on the one axial side. A support plate 18D for fixedly supporting the electric motor 22, which will be described below, is provided on the outer peripheral side of the speed reducer casing 18A.

The input rod 20 is inserted into the booster housing 18 from the cover member 18C side. The input rod 20 axially extends toward the first hydraulic pressure chamber 12A in the booster piston 19. A pair of neutral springs 20A and 20B is interposed between the booster piston 19 and the input rod 20. The booster piston 19 and the input piston 20 are elastically held at neutral positions by the spring forces of the neutral springs 20A and 20B. In other words, the spring forces of the neutral springs 20A and 20B are applied to the booster piston 19 and the input piston 20 according to the axial relative displacement between them.

The end surface of the input rod 20 on the distal end side, i.e., the end surface of the input rod 20 on the other axial side (the left side in FIG. 2) receives the hydraulic pressure generated in the first hydraulic pressure chamber 12A as a brake reaction force at the time of the brake operation. The input rod 20 transmits the brake reaction force to the brake pedal 7. As a result, an appropriate response to the pressing can be returned to the driver of the vehicle via the brake pedal 7, and an excellent pedal feeling (a feeling that the brake is working) can be acquired. As a result, the operational feeling of the brake pedal 7 can be improved, and the pedal feeling (the response to the pressing) can be kept excellent. Further, the input rod 20 can cause the booster piston 19 to move forward by abutting against the booster piston 19 when moving forward by a predetermined amount relative to the booster piston 19. This configuration allows the booster piston 19 to move forward according to the pressing force applied to the brake pedal 7 to generate the hydraulic pressure in the master cylinder 9, when a failure has occurred in the electric actuator 21 or the first ECU 27, which will be described below.

The electric actuator 21 of the electric boosting apparatus 17 includes the electric motor 22, the speed reduction mechanism 24, and a linear motion mechanism 25. The electric motor 22 is provided on the speed reducer casing 18A of the booster housing 18 via the support plate 18D. The speed reduction mechanism 24 is, for example, a belt that slows down the rotation of the electric motor 22 and transmits it to a cylindrical rotational member 23 in the speed reducer casing 18A. The linear motion mechanism 25 is, for example, a ball screw that converts the rotation of the cylindrical rotational member 23 into the axial displacement (the forward or rearward movement) of the booster piston 19. The booster piston 19 and the input rod 20 are placed in such a manner that the respective front end portions thereof (the end portions on the other axially side) face the first hydraulic pressure chamber 12A of the master cylinder 9. The booster piston 19 and the input rod 20 cause the brake hydraulic pressure to be generated in the master cylinder 9 by the pressing force (a thrust force) transmitted from the brake pedal 7 to the input rod 20 and the booster thrust force transmitted from the electric actuator 21 to the booster piston 19.

In other words, the booster piston 19 of the electric boosting apparatus 17 is driven by the electric actuator 21 based on the output of the operation amount detection sensor 8 (a control instruction). The booster piston 19 forms a pump mechanism that generates the brake hydraulic pressure (a master cylinder pressure) in the master cylinder 9. Further, a return spring 26 is provided in the support casing 18B of the booster housing 18. The return spring 26 constantly biases the booster piston 19 in a braking release direction (the direction indicated by the arrow B in FIGS. 1 and 2). When the brake operation is released, the electric motor 22 is rotated in the reverse direction, and, along therewith, the booster piston 19 is returned as far as the initial position illustrated in FIG. 2 in the direction indicated by the arrow B under the biasing force of the return spring 26.

The electric motor 22 is constructed with use of, for example, a DC brushless motor. The electric motor 21 includes a rotational sensor 22A called a resolver and a current sensor that detects a motor current (not illustrated). Then rotational sensor 22A detects the rotational position (the rotational angle) of the electric motor 22 (the motor shaft thereof), and outputs a detection signal thereof to the first ECU 27. The first ECU 27 performs feedback control according to the rotational position signal of the rotational sensor 22A. Further, the rotational sensor 22A has a function as a rotation detection unit that detects an absolute displacement of the booster piston 19 from the vehicle body based on the detected rotational position of the electric motor 22.

Further, the rotational sensor 22A forms a displacement detection unit that detects the relative displacement amount between the booster piston 19 and the input rod 20 together with the operation amount detection sensor 8. The detection signal of the rotational sensor 22A and the detection signal of the operation amount detection sensor 8 are output to the first ECU 27. The rotation detection unit may be embodied with use of not only the rotational sensor 22A such as the resolver but also, for example, a rotary potentiometer capable of detecting the absolute displacement (the angle). The speed reduction mechanism 24 may be embodied with use of not only the belt and the like but also, for example, a gear speed reduction mechanism. Further, the linear motion mechanism 25, which changes the rotational motion into the linear motion, can also be embodied with use of, for example, a rack and pinion mechanism. Further, the speed reduction mechanism 24 does not necessarily have to be provided. For example, the electric motor 21 may be configured in such a manner that the motor shaft thereof is integrally provided to the cylindrical rotational member 23 and a stator of the electric motor is disposed around the cylindrical rotational member 23, by which the cylindrical rotational member 23 is rotated directly by the electric motor.

The ECU 27 includes, for example, a microcomputer. The first ECU 27 forms a part of the electric boosting apparatus 17. In this case, the first ECU 27 forms a first control circuit (an electric boosting apparatus controller) that electrically controls the driving of the electric actuator 21 (the electric motor 22) of the electric boosting apparatus 17.

The input side of the first ECU 27 is connected to the brake switch 7A, which detects whether the brake pedal 7 is operated, the operation amount detection sensor 8, which detects the operation amount or the pressing force of the brake pedal 7, the rotational sensor 22A and the above-described current sensor of the electric motor 22, an in-vehicle signal line 28, which can carry out, for example, communication called L-CAN (Local CONTROLLER AREA NETWORK), the vehicle data bus 29, which transmits and receives a signal to and from an ECU of another vehicle apparatus (for example, a third ECU 54 illustrated in FIG. 2), and the like. The vehicle data bus 29 is a serial communication portion called V-CAN (Vehicle CONTROLLER AREA NETWORK) that is mounted on the vehicle, and functions to carry out in-vehicle multiplex communication. Further, the first ECU 27 is connected to a power source line 30, and receives power supply from a battery 31 (refer to FIG. 1) via the power source line 30.

A hydraulic pressure sensor 32, which serves as a hydraulic pressure detection unit that detects the brake hydraulic pressure in the master cylinder 9, detects, for example, the hydraulic pressure in the cylinder-side hydraulic pressure pipe 16A. In other words, the hydraulic pressure sensor 32 detects the brake hydraulic pressure supplied from the master cylinder 9 to the hydraulic pressure supply apparatus 33, which will be described below, via the cylinder-side hydraulic pressure pipe 16A. In the embodiment, the hydraulic pressure sensor 32 is electrically connected to the second ECU 35, which will be described below. The detection signal output by the hydraulic pressure sensor 32 is also transmitted from the second ECU 35 to the first ECU 27 via the communication using the signal line 28. The hydraulic pressure sensor 32 may be provided by being directly attached to the master cylinder 9 as long as the hydraulic pressure sensor 32 can detect the brake hydraulic pressure in the master cylinder 9, and, further, may be configured in such a manner that the detection signal thereof is directly input to the first ECU 27 without the intervention of the second ECU 35.

The output side of the first ECU 27 is connected to the electric motor 22, the in-vehicle signal line 28, the vehicle data bus 29, and the like. The first ECU 27 variably controls the brake hydraulic pressure to generate in the master cylinder 9 using the electric actuator 21 according to, for example, the detection signals from the operation amount detection sensor 8 and the hydraulic pressure sensor 32, and also has a function of determining, for example, whether the electric boosting apparatus 17 operates normally.

For example, when the brake pedal 7 is operated by being pressed, the input rod 20 moves forward toward inside the cylinder main body 10 of the master cylinder 9, and the motion at this time is detected by the operation amount detection sensor 8. The first ECU 27 outputs an actuation instruction to the electric motor 22 according to the detection signal from the operation amount detection sensor 8 to rotationally drive the electric motor 22, and this rotation is transmitted to the cylindrical rotational member 23 via the speed reduction mechanism 24. The rotation of the cylindrical rotational member 23 is converted into the axial displacement of the booster piston 19 by the linear motion mechanism 25. At this time, the booster piston 19 moves forward toward inside the master cylinder main body 10 of the master cylinder 9 integrally with the input rod 20. As a result, the brake hydraulic pressures are generated in the first and second hydraulic pressure chambers 12A and 12B of the master cylinder 9 according to the pressing force (the thrust force) applied from the brake pedal 7 to the input rod 20 and the booster thrust force applied from the electric actuator 21 to the booster piston 19. Further, for example, in the case of a vehicle including an electric motor for running (an electric automobile or a hybrid automobile), the first ECU 27 can also cause the booster piston 19 to be displaced by the electric actuator 21 in such a manner that the brake hydraulic pressure reduces by an amount corresponding to a regenerative braking force when acquiring the braking force of the entire vehicle from both of the frictional braking force of the frictional braking apparatus 6 (a frictional brake) and the regenerative braking force of the electric motor for running (a regenerative brake).

Further, the first ECU 27 can monitor the hydraulic pressure generated in the master cylinder 9 by receiving the detection signal output from the hydraulic pressure sensor 32 via the signal line 28, and determine whether the electric boosting apparatus 17 operates normally.

Next, the hydraulic pressure supply apparatus 33 (hereinafter referred to as the ESC 33), which is provided between the wheel cylinders 4L, 4R, 5L, and 5R arranged on the respective wheel (the front wheels 2L and 2R and the rear wheels 3L and 3R) side of the vehicle and the master cylinder 9, will be described.

The ESC 33 forms a wheel cylinder pressure control apparatus that variably controls the brake hydraulic pressure generated in the master cylinder 9 (the first and second hydraulic pressure chambers 12A and 12B) by the electric boosting apparatus 17 as a wheel cylinder pressure for each of the wheels, and individually supplies the wheel cylinder pressure to each of the wheel cylinders 4L, 4R, 5L, and 5R on the respective wheels (the front wheels 2L and 2R and the rear wheels 3L and 3R).

In other words, the ESC 33 functions to supply required brake hydraulic pressures from the master cylinder 9 to the wheel cylinders 4L, 4R, 5L, and 5R via the cylinder-side hydraulic pressure pipes 16A and 16B and the like when various kinds of brake control (for example, braking force distribution control of distributing the braking force for each of the front wheels 2L and 2R and the rear wheels 3L and 3R, anti-lock brake control, vehicle stabilization control, and the like) are performed.

Then, the ESC 33 distributes and supplies the hydraulic pressures output from the master cylinder 9 (the first and second hydraulic pressure chambers 12A and 12B) via the cylinder-side hydraulic pressure pipes 16A and 16B to the wheel cylinders 4L, 4R, 5L, and 5R via brake-side pipe portions 34A, 34B, 34C, and 34D, respectively. As a result, the braking force independent of one another is individually provided for each of the wheels (the front wheels 2L and 2R and the rear wheels 3L and 3R) as described above. The ESC 33 includes each of control vales 40, 40', 41, 41', 42, 42', 45, 45', 46, 46', 53, and 53', which will be described below, an electric motor 48 that drives hydraulic pressure pumps 47 and 47', hydraulic pressure control reservoirs 52 and 52', and the like.

The second ECU 35 includes, for example, a microcomputer. This second ECU 35 forms a part of the ESC 33. In this case, the second ECU 35 forms a second control circuit (a hydraulic pressure supply apparatus controller) that electrically controls the driving of the ESC 33. Further, the second ECU 35 corresponds to a parking brake control apparatus that controls the actuation of the parking mechanism 55, which will be described below. In other words, the second ECU 35 also forms a third control circuit that electrically controls the driving of the parking mechanism 55 (a parking mechanism controller). In sum, the second control circuit (the hydraulic pressure supply apparatus controller) and the third control circuit (the parking mechanism controller) are formed by a single ECU (ECU: Electronic Control Unit). In the embodiment, the second ECU 35 (the parking brake control apparatus) forms a brake system together with the ESC 33.

The input side of the second ECU 35 is connected to the hydraulic pressure sensor 32, the signal line 28, the vehicle data bus 29, a parking brake switch 56, which will be described below, and the like. The output side of the second ECU 35 is connected to each of the control vales 40, 40', 41, 41', 42, 42', 45, 45', 46, 46', 53, and 53', which will be described below, the electric motor 48, the signal line 28, the vehicle data bus 29, the parking mechanism 55, and the like. Further, the second ECU 35 is connected to the power source line 30, and receives power supply from the battery 31 (refer to FIG. 1) via the power source line 30.

Then, the second ECU 35 individually controls the driving of each of the control vales 40, 40', 41, 41', 42, 42', 45, 45', 46, 46', 53, and 53', the electric motor 48, and the like of the ESC 33, as will be described below. By this control, the second ECU 35 individually performs control of reducing, maintaining, and increasing or pressurizing the brake hydraulic pressures to supply from the brake-side pipe portions 34A to 34D to the wheel cylinders 4L, 4R, 5L, and 5R, respectively, for each of the wheel cylinders 4L, 4R, 5L, and 5R.

More specifically, by controlling the actuation of the ESC 33, the second ECU 35 can perform, for example, the braking force distribution control of appropriately distributing the braking force to each of the wheels (the front wheels 2L and 2R and the rear wheels 3L and 3R) according to a vertical load and the like when the vehicle is braked, the anti-lock brake control of preventing the wheels 2L, 2R, 3L, and 3R from being locked by autonomously adjusting the braking force on each of the wheels 2L, 2R, 3L, and 3R when the vehicle is braked, the vehicle stabilization control of stabilizing the behavior of the vehicle by suppressing understeer and oversteer while detecting a sideslip of the wheels 2L, 2R, 3L, and 3R when the vehicle is running to appropriately autonomously control the braking force to apply to each of the wheels 2L, 2R, 3L, and 3R regardless of the operation amount on the brake pedal 7, hill start aid control of aiding a start by holding a braked state on a slope (especially, an upslope), traction control of preventing the wheels from idly spinning, for example, when the vehicle starts running, vehicle following control of maintaining a predetermined inter-vehicle distance to a preceding vehicle, traffic lane departure avoidance control of keeping the vehicle within a traffic lane, and obstacle avoidance control of avoiding a collision with an obstacle in front of or behind the vehicle.

The ESC 33 includes two hydraulic pressure circuit systems, namely, a first hydraulic pressure system 36 and a second hydraulic pressure system 36'. The first hydraulic pressure system 36 is connected to one of output ports of the master cylinder 9, i.e., the cylinder-side hydraulic pressure pipe 16A. The first hydraulic pressure system 36 supplies the hydraulic pressures to the wheel cylinder 4L on the front left wheel (FL) side and the wheel cylinder 5R on the rear right wheel (RR) side. The second hydraulic pressure system 36' is connected to the other of the output ports of the master cylinder 9, i.e., the cylinder-side hydraulic pressure pipe 16B. The second hydraulic pressure system 36' supplies the hydraulic pressures to the wheel cylinder 4R on the front right wheel (FR) side and the wheel cylinder 5L on the rear left wheel (RL) side. Now, the first hydraulic pressure system 36 and the second hydraulic pressure system 36' are configured similarly to each other. Therefore, in the following description, only the first hydraulic pressure system 36 will be described. For the second hydraulic pressure system 36', a mark "'" will be added to the reference numeral of each of components, and the description thereof will be omitted.

The first hydraulic pressure system 36 of the ESC 33 includes a brake conduit 37 connected to the distal end side of the cylinder-side hydraulic pressure pipe 16A. The brake conduit 37 branches into two first and second conduit portions 38 and 39, and is connected to each of the wheel cylinders 4L and 5R. The brake conduit 37 and the first conduit portion 38 form a conduit that supplies the hydraulic pressure to the wheel cylinder 4L together with the brake-side pipe portion 34A. The brake conduit 37 and the second conduit portion 39 form a conduit that supplies the hydraulic pressure to the wheel cylinder 5R together with the brake-side pipe portion 34D.

The supply control valve 40 for the brake hydraulic pressure is provided in the brake conduit 37. The supply control valve 40 is made of a normally-opened electromagnetic switching valve that opens and closes the brake conduit 37. The pressure increase control valve 41 is provided in the first conduit portion 38. The pressure increase control valve 41 is made of a normally-opened electromagnetic switching valve that opens and closes the first conduit portion 38. The pressure increase control valve 42 is provided in the second conduit portion 39. The pressure increase control valve 42 is made of a normally-opened electromagnetic switching valve that opens and closes the second conduit portion 39.

On the other hand, the first hydraulic pressure system 36 of the ESC 33 includes the first and second pressure reduction conduits 43 and 44 that connect the wheel cylinder 4L and 5R side and the hydraulic pressure control reservoir 52 to each other. The first and second pressure reduction control valves 45 and 46 are provided in these pressure reduction conduits 43 and 44, respectively. The first and second pressure reduction control valves 45 and 46 are made of normally-closed electromagnetic switching valves that open and close the pressure reduction conduits 43 and 44, respectively.

Further, the ESC 33 includes the hydraulic pressure pump 47 as a hydraulic pressure generation unit serving as a hydraulic pressure source. The hydraulic pressure pump 47 is rotationally driven by the electric motor 48. Now, the electric motor 48 is driven by power supply from the second ECU 35. When the power supply is stopped, the rotation of the electric motor 48 is stopped together with the hydraulic pressure pump 47. The discharge side of the hydraulic pressure pump 47 is connected to a position on the downstream side of the supply control valve 40 in the brake conduit 37, more specifically, a position where the brake conduit 37 branches into the first conduit portion 38 and the second conduit portion 39 via a check valve 49. The intake side of the hydraulic pressure pump 47 is connected to the hydraulic pressure control reservoir 52 via check valves 50 and 51.

The hydraulic pressure control reservoir 52 temporarily stores extra brake fluid therein. The hydraulic pressure control reservoir 52 temporarily stores therein the extra brake fluid flowing out from a cylinder chamber (not illustrated) of each of the wheel cylinders 4L and 5R at the time of not only the anti-lock brake control but also brake control other than that. Further, the intake side of the hydraulic pressure pump 47 is connected to the cylinder-side hydraulic pressure pipe 16A of the master cylinder 9, i.e., a position on the upstream side of the supply control valve 40 in the brake conduit 37 via the check valve 50 and the pressure increase control valve 53, which is a normally-closed electromagnetic switching valve.

The electric motor 48, which drives each of the control valves 40, 40', 41, 41', 42, 42', 45, 45', 46, 46', 53, and 53', and the hydraulic pressure pumps 47 and 47' forming the ESC 33, operates to allow each operation control process to be performed according to a predetermined procedure in compliance with the control signal output from the second ECU 35. More specifically, the first hydraulic pressure system 36 of the ESC 33 directly supplies the hydraulic pressure generated in the master cylinder 9 by the electric boosting apparatus 17 to the wheel cylinders 4L and 5R via the brake conduit 37 and the first and second conduit portions 38 and 39 at the time of a normal operation according to the driver's brake operation. For example, when distributing the braking force, the first hydraulic pressure system 36 discharges the hydraulic pressure in the wheel cylinder 4L to the hydraulic pressure control reservoir 52 by closing the supply control valve 40 and the pressure increase control valve 41 and opening the pressure reduction control valve 45. Further, the first hydraulic pressure system 36 pressurizes the brake fluid by opening the pressure increase valve 42 and the pressurization control valve, closing the pressure reduction control valve 46, and actuating the hydraulic pressure pump 47 with use of the electric motor 48, and supplies this hydraulic pressure to the wheel cylinder 5R via the second conduit portion 39.

Further, for example, the first hydraulic pressure system 36 maintains the hydraulic pressures in the wheel cylinders 4L and 5R by closing the pressure increase control valves 41 and 42, respectively, when performing the anti-lock control or the like, and discharges the hydraulic pressures in the wheel cylinders 4L and 5R so as to release them to the hydraulic pressure control reservoir 52 by opening the pressure reduction control valves 45 and 46, respectively, when reducing the hydraulic pressures in the wheel cylinders 4L and 5R. when increasing the hydraulic pressures to supply to the wheel cylinders 4L and 5R to perform, for example, the stabilization control (electronic stability control) when the vehicle is running, the first hydraulic pressure system 36 actuates the hydraulic pressure pump 47 by the electric motor 48 with the supply control valve 40 closed. Due to this operation, the first hydraulic pressure system 36 supplies the brake fluid discharged from the hydraulic pressure pump 47 to the wheel cylinders 4L and 5R via the first and second conduit portions 38 and 39, respectively. At this time, because the pressurization control valve 53 is opened, the brake fluid in the reservoir 15 is supplied from the master cylinder 9 side toward the intake side of the hydraulic pressure pump 47.

In this manner, the second ECU 35 controls the actuation of the supply control valve 40, the pressure increase control valves 41 and 42, the pressure reduction control valves 45 and 46, the pressurization control valve 53, and the electric motor 48 (i.e., the hydraulic pressure pump 47) to maintain, reduce, or increase the hydraulic pressures to supply to the wheel cylinders 4L and 5R as appropriate based on vehicle driving information and the like. This operation realizes the execution of the brake control such as the above-described braking force distribution control, vehicle stabilization control, brake assist control, anti-lock brake control, traction control, and hill start aid control.

A known hydraulic pressure pump, such as a plunger pump, a trochoid pump, and a gear pump, can be used as the hydraulic pressure pump 47, but it is desirable to use a gear pump as the hydraulic pressure pump 47 in consideration of mountability to the vehicle, tranquility, pump efficiency, and the like. A known motor, such as a DC motor, a DC brushless motor, and an AC motor, can be used as the electric motor 48, but a DC motor is used as the electric motor 48 in the embodiment from the viewpoint of mountability to the vehicle and the like.

Further, the characteristic of each of the control valves 40, 41, 42, 45, 46, and 53 of the ESC 33 can be set as appropriate according to respective use situations. Then, the hydraulic pressures can be supplied from the master cylinder 9 to the wheel cylinders 4L to 5R even when the control signal is not issued from the second ECU 35, by configuring the supply control valve 40 and the pressure increase control valves 41 and 42 as normally-opened valves, and the pressure reduction control valves 45 and 46 and the pressurization control valve 53 as normally-closed valves among those valves. Therefore, the employment of this configuration is desirable from the viewpoint of a fail-safe and control efficiency of the brake system.

Next, the parking mechanism 55 built in each of the rear wheel-side wheel cylinders 5L and 5R will be described.

The frictional braking apparatus 6 on the rear wheel side includes the parking mechanism 55 as the braking force holding mechanism that holds the braking force on the vehicle. The parking mechanism 55 is an electric parking mechanism (an electric parking mechanism). The parking mechanism 55 includes, for example, the electric motor, the speed reducer, and the rotation-linear motion conversion mechanism (the braking force holding mechanism). The parking mechanism 55 is controlled by, for example, the second ECU 35 also serving as the parking brake control apparatus. Therefore, the electric motor of the parking mechanism 55 is connected to the second ECU 35. The electric motor of the parking mechanism 55 corresponds to an electric motor configured to drive the parking mechanism 55. The electric motor of the parking mechanism 55 forms an electric brake apparatus (an electric parking brake apparatus) together with the second ECU 35 serving as a control apparatus that controls the driving of this electric motor.

With the frictional lining of the frictional braking apparatus 6 pressed against the rotational member D, i.e., the braking force applied, the parking mechanism 55 can hold this braking force. Examples employable as the frictional braking apparatus 6 including the parking mechanism 55 configured in this manner include a hydraulic disk brake additionally including a drum parking mechanism that presses shoes against a drum using an electric motor, a hydraulic drum brake including a parking mechanism that presses shoes against a drum using an electric motor, and a hydraulic disk brake or a drum brake including a cable puller parking mechanism that pulls a cable using an electric motor, besides the hydraulic disk brake including the parking mechanism 55 that presses the pads against the disk using the electric motor. In sum, the parking mechanism 55 can be embodied using any of various types of parking mechanisms (electric parking mechanisms) that can hold (apply) and release the braking force based on the driving of the electric motor.

Further, the parking mechanism 55 may be disposed on the front wheel side. More specifically, in the embodiment, the rear wheels 3L and 3R correspond to the braking force holding wheel including the parking mechanism 55, and the front wheels 2L and 2R correspond to the non-braking force holding wheel not including the parking mechanism 55. However, the configuration is not limited thereto, and, for example, the vehicle may be configured in such a manner that the front wheel corresponds to the braking force holding wheel including the parking mechanism and the rear wheel corresponds to the non-braking force holding wheel not including the parking mechanism. In sum, the vehicle can be configured to include the braking force holding wheel and the non-braking force holding wheel. Then, the ESC 33 as the braking force distribution apparatus distributes the braking force to apply to the braking force holding wheel (the rear wheels 3L and 3R in the embodiment) and the non-braking force holding wheel (the front wheels 2L and 2R in the embodiment) of the vehicle.

The parking mechanism 55 operates based on the operation on the parking brake switch (PSW) 56. The parking brake switch 56 is connected to, for example, the second ECU 35. The parking brake switch 56 outputs a signal (an actuation request signal) corresponding to a request to actuate the parking brake (an application request working as a holding request or a release request working as an end request) according to an operation instruction from the driver to the second ECU 35. When the parking brake switch 56 is operated to a braking side (an application side) by the driver, the second ECU 35 actuates (applies) the parking brake, and causes the frictional lining to be pressed against the rotational member D with a desired force (for example, a force capable of keeping the vehicle stopped) using the parking mechanism 55. On the other hand, when the parking brake switch 56 is operated to a braking end side (a release side), the second ECU 35 ends (releases) the parking brake, thereby releasing the force with which the frictional lining is pressed against the rotational member D.

In the embodiment, the second ECU 35 causes the parking mechanism 55 to perform an application operation and a release operation when receiving the request to actuate the parking mechanism 55 based on the operation on the parking brake switch 56. In addition thereto, the second ECU 35 causes the parking mechanism 55 to perform the application operation and the release operation when receiving a request to actuate the parking mechanism 55 from another ECU such as the third ECU 54 that controls autonomous driving (FIG. 2) via the vehicle data bus 29. Further, the second ECU 35 causes the parking mechanism 55 to autonomously perform the application operation and the release operation based on an autonomous application request according to a logic for determining the application of the parking brake in the second ECU 35.

In this case, the second ECU 35 can acquire vehicle information transmitted from another ECU (not illustrated) mounted on the vehicle via the vehicle data bus 29, such as a steering angle, a longitudinal G, a lateral G, and a yaw rate. Further, the wheel speed sensors 57 are provided near the front wheels 2L and 2R and the rear wheels 3L and 3R, respectively. The wheel speed sensors 57 detect the speeds of these wheels 2L, 2R, 3L, and 3R (a wheel speed). The wheel speed sensors 57 are connected to the second ECU 35. The second ECU 35 can acquire the wheel speed of each of the wheels 2L, 2R, 3L, and 3R based on a signal from each of the wheel speed sensors 57. The second ECU 35 can cause the parking mechanism 55 to operate based on various kinds of information including the wheel speed.

The parking brake switch 56 is connected to the second ECU 35 in the embodiment, but, for example, the brake system may be configured in such a manner that the parking brake switch 56 is connected to the first ECU 27, and the signal of the parking brake switch 56 (the application instruction and the release instruction) is input to the second ECU 35 via the first ECU 27 and the vehicle data bus 29. Alternatively, the brake system may be configured in such a manner that the parking brake switch 56 is connected to the vehicle data bus 29, and the signal of the parking brake switch 56 is input to the second ECU 35 via the vehicle data bus 29. Further, the brake system is configured in such a manner that the actuation of the ESC 35 and the actuation of the parking mechanism 55 are controlled by the second ECU 35 in the embodiment, but may be configured to include an ECU that controls the actuation of the ESC 33 and an ECU that controls the actuation of the parking mechanism 55 separately.

Now, when the parking brake is actuated after the vehicle is stopped with braking on the four wheels (normal braking), and the braking on the four wheels is released after that, the posture of the vehicle may be changed according to the release of the braking forces on the four wheels. This change in the posture causes just a slight uncomfortable feeling if occurring based on the driver's operation but may make the driver feel uncomfortable if occurring during autonomous parking (the autonomous application) or autonomous driving. Then, in the technique discussed in the above-described patent literature, PTL 1, the braking forces on the front wheels are released unrecognizably by taking advantage of the pitching of the vehicle at the moment that the vehicle is stopped. This means that the technique discussed in PTL 1 reduces the uncomfortable feeling based on the assumption that the pitching occurs on the vehicle when the vehicle is stopped. Therefore, if the vehicle is slowly stopped so as not to cause the pitching, this technique may fail to make unrecognizable the change in the posture due to the release of the braking forces on the front wheels by taking advantage of the pitching, thereby failing to reduce the uncomfortable feeling accompanying the release of the braking forces on the front wheels. On the other hand, when limiting the driving forces on the rear wheels so as not to exceed the maximum driving force of the two rear wheels that is calculated using the friction circle, the technique discussed in PTL 2 does not perform control of compensating for these limited driving forces by the two front wheels, thereby raising a possibility of reducing the total driving force. More specifically, if reviewing this technique while replacing the driving force with a frictional force, the total braking force is supposed to reduce during braking, and this may make it impossible to generate the requested braking force. As a result, the behavior of the vehicle may be disturbed during braking.

Under these circumstances, in the embodiment, the vehicle is stopped with a strong braking force applied to the braking force holding wheel (the rear wheels 3L and 3R) before the parking brake is actuated. As a result, the change in the posture can be reduced when the braking force on the non-braking holding wheel (the front wheels 2L and 2R) is released after the parking brake is actuated. Further, in the embodiment, the braking force distribution apparatus increases the distribution of the braking force to the braking force holding wheel (the rear wheels 3L and 3R) according to a reduction in the speed of the vehicle body (the vehicle speed). In this case, in the embodiment, the braking force distribution apparatus, for example, sets a limit on the distribution of the braking force according to a slip amount. As a result, the total braking force can be prevented from reducing during braking, and therefore the behavior of the vehicle can be less disturbed.

More specifically, in the embodiment, the ESC 33 as the braking force distribution apparatus increases the distribution of the braking force to the rear wheels 3L and 3R (the braking force holding wheel) according to a reduction in the speed of the vehicle due to braking, and distributes the braking force so as to allow the vehicle to be kept stopped due to the braking forces applied to the rear wheels 3L and 3R when the vehicle is stopped. The ESC 33 distributes the braking force by controlling the fluid amount. For example, the ESC 33 controls the fluid amount of the brake fluid to supply from the master cylinder 9 to the wheel cylinders 4L, 4R, 5L, and 5R by controlling the opening degrees of the control valves 41, 41', 42, and 42'. By this control, the ESC 33 distributes the braking force to the rear wheels 3L and 3R and the front wheels 2L and 2R. In this case, the ESC 33 reduces the distribution of the braking force to the front wheels 2L and 2R as the vehicle speed reduces due to braking. More specifically, the ESC 33 sets the distribution of the braking force to the front wheels 2L and 2R to almost zero when the vehicle is stopped.

Then, the second ECU 35 (hereinafter may also be referred to as simply the "ECU 35") as the parking brake control apparatus holds the braking force by the parking mechanism 55 with the vehicle kept stopped due to the braking forces applied to the rear wheels 3L and 3R. In other words, the ECU 35 as the control apparatus holds the braking force by driving the electric motor of the parking mechanism 55 with the braking force distributed only to the rear wheels 3L and 3R, each of which is the wheel including the parking mechanism 55.

Then, the ESC 33 can distribute the braking force at the time of braking according to the driver's operation on the brake pedal 7 and/or at the time of autonomous braking independent of the operation on the brake pedal 7. For example, the ESC 33 increases the distribution of the braking force to the rear wheels 3L and 3R according to a reduction in the vehicle speed due to braking at the time of the braking independent of the operation on the brake pedal 7. Further, the ESC 33 distributes the braking force so as to allow the vehicle to be kept stopped due to the braking forces applied to the rear wheels 3L and 3R when the vehicle is stopped at the time of the braking independent of the operation on the brake pedal 7. As described above, the ESC 33 sets a maximum braking force distribution ratio of the rear wheels 3L and 3R according to the slip amount of the rear wheels 3L and 3R. In other words, the maximum braking force distribution ratio according to the slip amount of the rear wheels 3L and 3R is set in the ESC 33.

Figure 3:
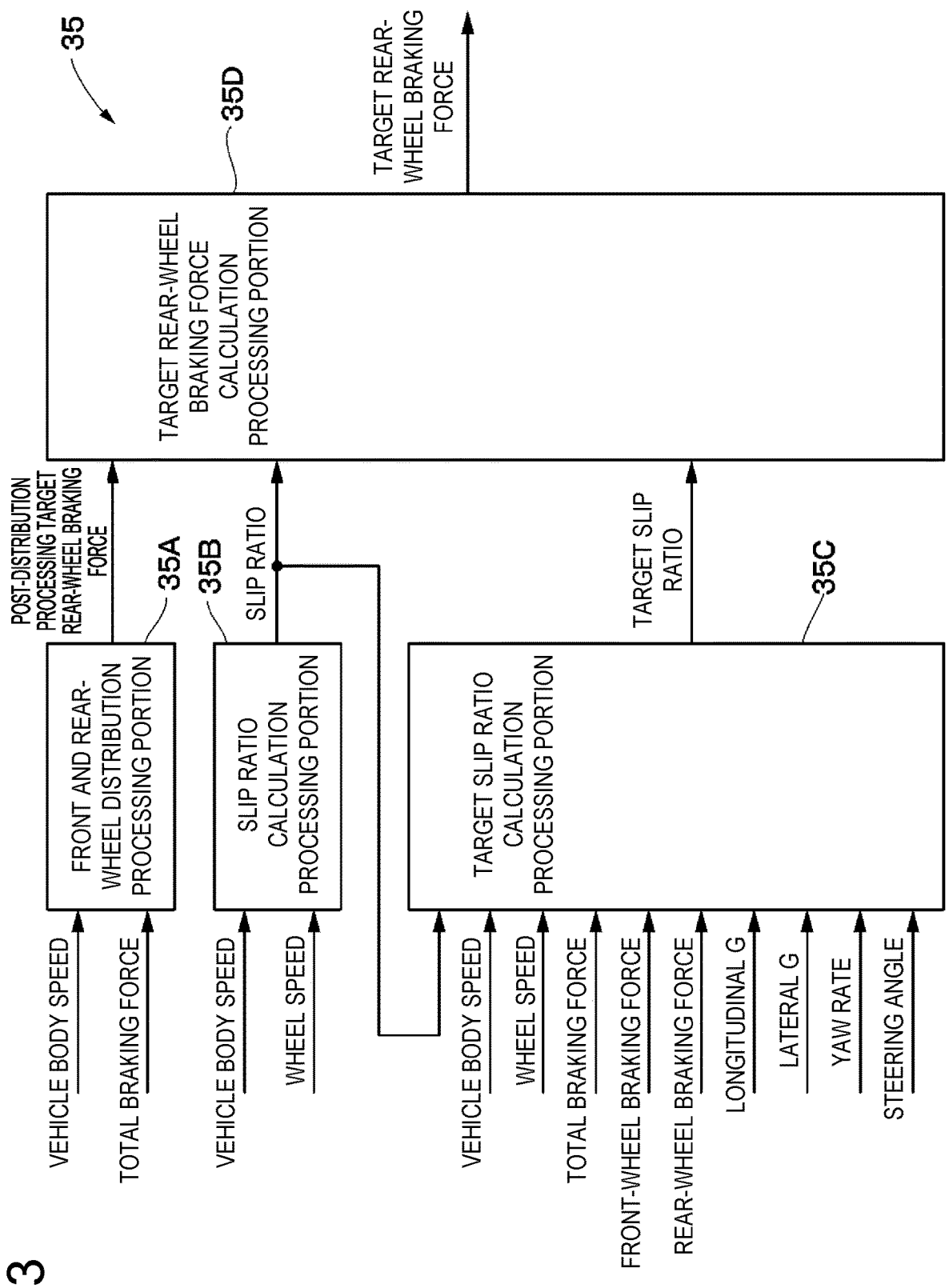
FIG. 3 is a block diagram illustrating processing for controlling distribution of a braking force that is performed by a second ECU illustrated in FIG. 1.

To achieve such distribution of the braking force, the ECU 35 of the ESC 33 calculates a target rear-wheel braking force by four processing procedures to reduce the change in the posture as illustrated in FIG. 3. FIG. 3 is a block diagram illustrating processing for controlling the distribution of the braking force performed by the ECU 35 of the ESC 33 (more specifically, processing for calculating the target rear-wheel braking force). The ECU 35 includes a front and rear-wheel distribution processing portion 35A, a slip ratio calculation processing portion 35B, a target slip ratio calculation processing portion 35C, and a target rear-wheel braking force calculation processing portion 35D to calculate the target rear-wheel braking force. The ECU 35 performs front and rear-wheel distribution processing by the front and rear-wheel distribution processing portion 35A, performs slip ratio calculation processing by the slip ratio calculation processing portion 35B, performs target slip ratio calculation processing by the target slip ratio calculation processing portion 35C, and performs target rear-wheel braking force calculation processing by the target rear-wheel braking force calculation processing portion 35D. The memory of the ECU 35 stores therein a processing program for performing the front and rear-wheel distribution processing, the slip ratio calculation processing, the target slip ratio calculation processing, and the target rear-wheel braking force calculation processing. These control processing procedures are repeatedly performed per predetermined control period, such as 10 ms, after the ECU 35 is started up.

Figure 4:
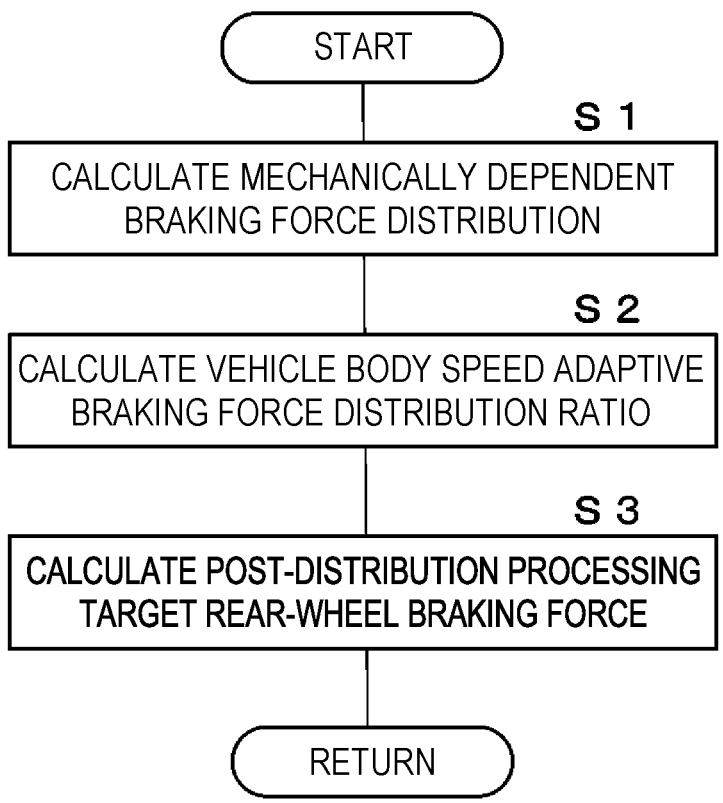
FIG. 4 is a flowchart illustrating processing performed by a front and rear wheel distribution processing portion illustrated in FIG. 3.

The ECU 35 calculates a post-distribution processing target rear-wheel braking force by the front and rear-wheel distribution processing portion 35A. The vehicle body speed and the total braking force are input to the front and rear-wheel distribution processing portion 35A. The total braking force is input to the front and rear-wheel distribution processing portion 35A as, for example, a total braking force instruction value based on the operation on the brake pedal 7 or a total braking force instruction value based on the autonomous driving. The front and rear-wheel distribution processing portion 35A calculates the post-distribution processing target rear-wheel braking force based on the vehicle body speed and the total braking force, and outputs the calculated post-distribution processing rear-wheel braking force to the target rear-wheel braking force calculation processing portion 35D. FIG. 4 is a flowchart illustrating the processing performed by the front and rear-wheel distribution processing portion 35A. When the control processing illustrated in FIG. 4 is started, in S1, the front and rear-wheel distribution processing portion 35A calculates a mechanically dependent rear-wheel braking force. The mechanically dependent rear-wheel braking force is calculated by multiplying the total braking force calculated from the braking forces generated on the frictional braking apparatuses 6 of the four wheels 2L, 2R, 3L, and 3R by a mechanically dependent braking force distribution ratio, which is calculated based on the effective diameters of the respective front calipers, the piston sizes, the pad μ, and the like.

Figure 5:
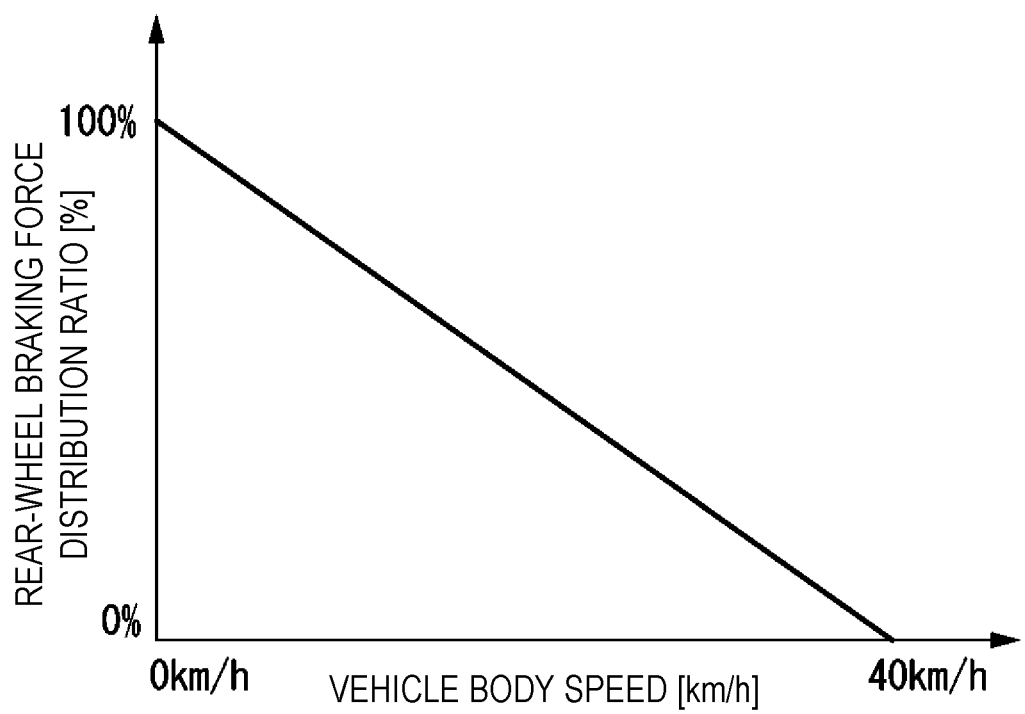
FIG. 5 illustrates a characteristic line indicating one example of the relationship between a vehicle body speed (a vehicle speed) and a rear-wheel braking force distribution ratio.

Next, in S2, the front and rear-wheel distribution processing portion 35A calculates a vehicle body speed adaptive braking force distribution ratio. The vehicle body speed adaptive braking force distribution ratio is calculated by inputting the vehicle body speed based on table values illustrated in FIG. 5, i.e., the relationship between the rear-wheel braking force distribution ratio and the vehicle body speed. The relationship between the rear-wheel braking force distribution ratio and the vehicle body speed is set in advance so as to achieve a distribution ratio not making the driver feel uncomfortable according to a change in the posture due to the distribution of the braking force. The table values are set so as to prevent the driver from feeling uncomfortable due to a change gradient of a deceleration generated due to a change in the posture when the braking force is distributed at the rear-wheel braking force distribution ratio from 0 [%] to 100 [%] at the time of braking of 1.0 [G]. In S3, the front and rear-wheel distribution processing portion 35A calculates the post-distribution processing target rear-wheel braking force. The post-distribution processing target rear-wheel braking force is calculated by performing processing for selecting higher one of a "value calculated by multiplying the total braking force by the vehicle body speed adaptive braking force distribution ratio" and the "mechanically dependent rear-wheel braking force". After the post-distribution processing target rear-wheel braking force is calculated, the processing proceeds to RETURN. More specifically, the front and rear-wheel distribution processing portion 35A outputs the post-distribution processing target rear-wheel braking force to the target rear-wheel braking force calculation processing portion 35D. Along therewith, the processing returns to START via RETURN, followed by a repetition of the processing in and after S1.

On the other hand, the ECU 35 calculates the slip ratio (an actual slip ratio) by the slip ratio calculation processing portion 35B. The vehicle body speed and the wheel speed are input to the slip ratio calculation processing portion 35B. The slip ratio calculation processing portion 35B calculates the slip ratio based on the vehicle body speed and the wheel speed, and outputs the calculated slip ratio to the target slip ratio calculation processing portion 35C and the target rear-wheel braking force calculation processing portion 35D. The slip ratio is calculated with use of the following equation 1. More specifically, the actual slip ratio is calculated by dividing a difference between the vehicle body speed and the wheel speed by the vehicle body speed.

$$\text{slip ratio [\%]} = (\text{wheel speed [km/h]} - \text{vehicle body speed [km/h]})/\text{vehicle body speed [km/h]} \times 100 \text{ [\%]} \quad \text{[Equation 1]}$$

Then, examples usable as the vehicle body speed include an absolute speed detected using a ground speed sensor or the like, an external signal of a GPS or the like, and an estimated value calculated based on the wheel speeds of the four wheels 2L, 2R, 3L, and 3R and the value of the longitudinal G sensor. According to the equation 1, the slip ratio has a positive value during acceleration because the wheel speed exceeds the vehicle body speed, and has a negative value during deceleration because the wheel speed falls below the vehicle body speed. The slip ratio calculation processing portion 35B repeats the calculation and the output of the slip ratio along with outputting the calculated slip ratio to the target slip ratio calculation processing portion 35C and the target rear-wheel braking force calculation processing portion 35D.

Figure 6:
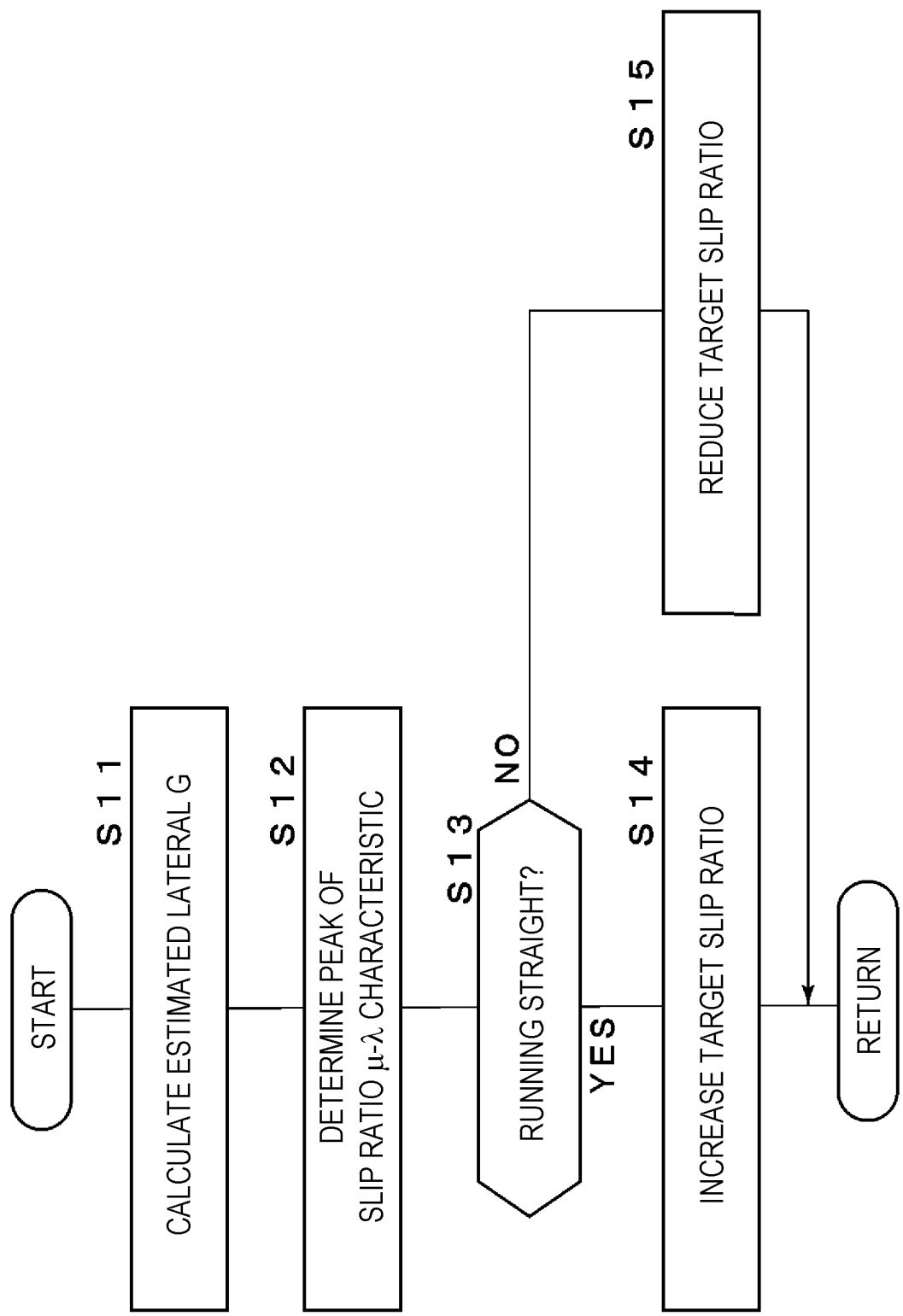
FIG. 6 is a flowchart illustrating processing performed by a target slip ratio calculation processing portion illustrated in FIG. 3.

The ECU 35 calculates a target slip ratio by the target slip ratio calculation processing portion 35C. The slip ratio, the vehicle body speed, the wheel speed, the total braking force, the front-wheel braking force, the rear-wheel braking force, the longitudinal G, the lateral G, the yaw rate, and the steering angle are input to the target slip ratio calculation processing portion 35C. The target slip ratio calculation processing portion 35C calculates the target slip ratio based on the slip ratio, the vehicle body speed, the wheel speed, the total braking force, the front-wheel braking force, the rear-wheel braking force, the longitudinal G, the lateral G, the yaw rate, and the steering angle, and outputs the calculated target slip ratio to the target rear-wheel braking force calculation processing portion 35D. FIG. 6 is a flowchart illustrating the processing performed by the target slip ratio calculation processing portion 35D.

After the control processing illustrated in FIG. 6 is started, in S11, the target slip ratio calculation processing portion 35C calculates an estimated lateral G. The estimated lateral G is calculated by selecting higher one of an "estimated lateral G before the selection that is calculated based on the steering angle and the wheel speed" and an "actual lateral G". In the subsequent step, S12, the target slip ratio calculation processing portion 35C determines a peak of μ-λ characteristic with use of the actual slip ratio calculated by the slip ratio calculation processing portion 35B. In the determination on the peak of the μ-λ characteristic, when the acceleration changes to the acceleration side, the target slip ratio calculation processing portion 35C keeps the slip ratio at a maximum value, and calculates the slip ratio when the acceleration reduces despite an increase in the slip ratio as a pre-limit slip ratio μ-λ characteristic maximum value. On the other hand, when the acceleration changes to the deceleration side, the target slip ratio calculation processing portion 35C keeps the slip ratio at a minimum value, and calculates the slip ratio when the acceleration increases despite a reduction in the slip ratio as a pre-limit slip ratio μ-λ characteristic minimum value. At this time, the value of the longitudinal G sensor may be used as the acceleration, but the acceleration side and the deceleration side may be erroneously determined when the slope of the road surface changes. Therefore, it is desirable to calculate the acceleration with use of the vehicle body speed, the driving force, or the braking force.

Further, the target slip ratio calculation processing portion 35C calculates a slip ratio μ-λ characteristic maximum value and a slip ratio μ-λ characteristic minimum value by performing limit processing on the calculated pre-limit slip ratio μ-λ characteristic maximum value and pre-limit slip ratio μ-λ characteristic minimum value. The slip ratio used in the present processing is calculated based on the vehicle body speed and the wheel speed, and therefore it is desirable to use a value subjected to filter processing for removing the influence of sensor noise. Further, because the sip ratio μ-λ characteristic changes according to the road surface μ, it is desirable to limit the slip ratio μ-λ characteristic minimum value within a range from −0.30 to −0.15 inclusive and limit the slip ratio μ-λ characteristic maximum value within a range from +0.15 to 0.30 inclusive. Further, because the road surface μ may be changed when the vehicle starts running again after being stopped first, the target slip ratio calculation processing portion 35C actuates the parking brake and resets the slip ratio μ-λ characteristic maximum value and the slip ratio μ-λ characteristic minimum value to initial values thereof when the above-described total braking force becomes zero. As the initial values into which the maximum value and the minimum value are reset, it is desirable to use +0.15 for the slip ratio μ-λ characteristic maximum value and use −0.15 for the slip ratio μ-λ characteristic minimum value to reduce the target slip ratio, which will be described below.

In S13, the target slip ratio calculation processing portion 35C determines whether the vehicle is running straight based on the above-described estimated lateral G, steering angle, and yaw rate. If the target slip ratio calculation processing portion 35C determines "YES", i.e., determines that the vehicle is running straight in S13, the processing proceeds to S14. In S14, the target slip ratio calculation processing portion 35C calculates the target slip ratio by increasing the previous value by a predetermined amount and limiting it with the slip ratio μ-λ characteristic maximum value and the slip ratio μ-λ characteristic minimum value. On the other hand, if the target slip ratio calculation processing portion 35C determines "NO", i.e., determines that the vehicle is not running straight in S13, the processing proceeds to S15. In this case, increasing the target slip ratio may lead to the deterioration of the behavior of the vehicle. Therefore, in S15, the target slip ratio calculation processing portion 35C calculates the target slip ratio by reducing the previous value by a predetermined amount and limiting it with the slip ratio μ-λ characteristic maximum value and the slip ratio μ-λ characteristic minimum value. Further, if the estimated lateral G, the steering angle, or the yaw rate reaches or exceeds a predetermined value, the target slip ratio calculation processing portion 35C resets the target slip ratio to the initial value. The amount by which the target slip ratio is increased or reduced may be variable with respect to the actual slip ratio or may be variable with respect to the total braking force. Further, after the target slip ratio is calculated in S14 or S15, the processing proceeds to RETURN. More specifically, the target slip ratio calculation processing portion 35C outputs the target slip ratio to the target rear-wheel braking force calculation processing portion 35D. Along therewith, the processing returns to START via RETURN, followed by a repetition of the processing in and after S11.

Figure 7:
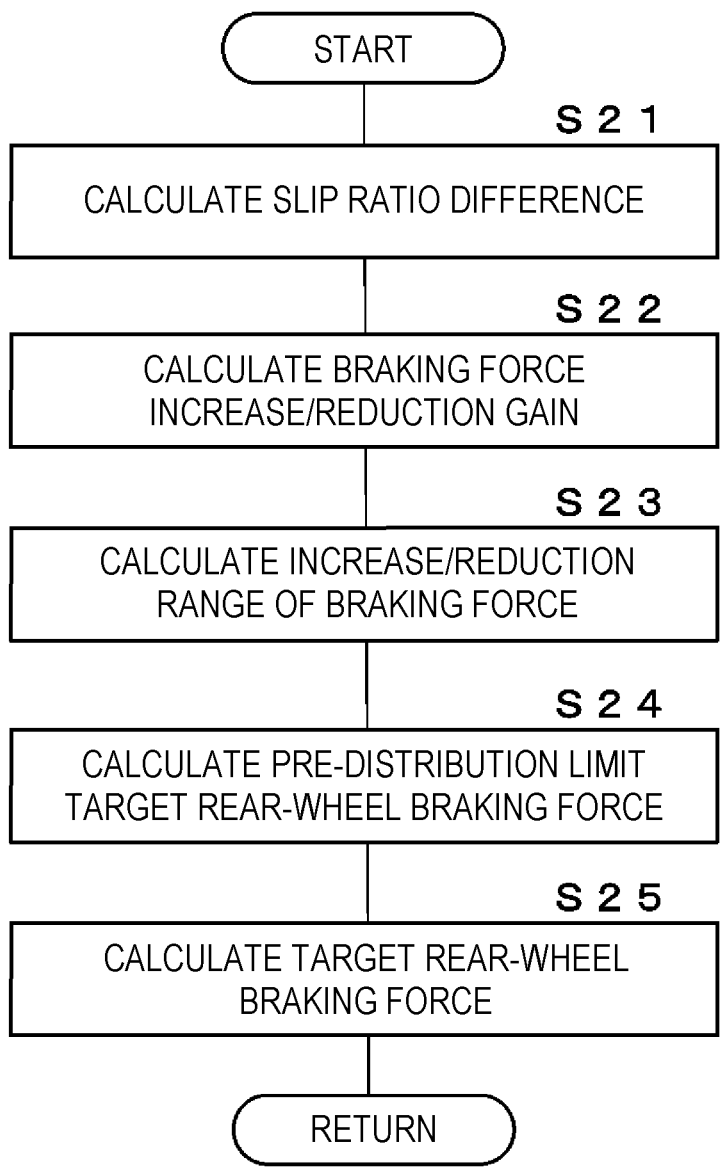
FIG. 7 is a flowchart illustrating processing performed by a target rear-wheel braking force calculation processing portion illustrated in FIG. 3.

The ECU 35 calculates the target rear-wheel braking force by the target rear-wheel braking force calculation processing portion 35D. The target rear-wheel braking force calculation processing portion 35D calculates the target rear-wheel braking force with use of the post-distribution processing target rear-wheel braking force calculated by the front and rear-wheel distribution processing portion 35A, the actual slip ratio calculated by the slip ratio calculation processing portion 35B, and the target slip ratio calculated by the target slip ratio calculation processing portion 35C. FIG. 7 is a flowchart illustrating the processing performed by the target rear-wheel braking force calculation processing portion 35D. After the control processing in FIG. 7 is started, in S21, the target rear-wheel braking force calculation processing portion 35D calculates a slip ratio difference based on the difference between the target slip ratio and the actual slip ratio. Next, in S22, the target rear-wheel braking force calculation processing portion 35D calculates a braking force increase/reduction gain with use of the above-described slip ratio difference. This braking force increase/reduction gain may be acquired by referring to a table, and is desirably calculated so as to have a small value for the slip ratio difference on the positive side and have a large value for the slip ratio difference on the negative side to suppress an increase in the actual slip ratio.

In S23, the target rear-wheel braking force calculation processing portion 35D calculates a braking force increase/reduction range by multiplying the change range of the braking force that is calculated based on the actual slip amount by the above-described braking force increase/reduction gain. The change range of the braking force may be acquired by referring to a table, or another input signal capable of associating the braking force and the slip ratio, such as the road surface μ, may be used as it. In S24, the target rear-wheel braking force calculation processing portion 35D calculates a pre-distribution limit target rear-wheel braking force by adding the above-described braking force increase/reduction range to the previous value of the target rear-wheel braking force. Further, in S25, the target rear-wheel braking force calculation processing portion 35D calculates the target rear-wheel braking force by performing processing that selects lower one of the pre-distribution limit target rear-wheel braking force and the post-distribution processing target rear-wheel braking force. The distribution of the braking force is realized without causing a change in the total braking force by setting the difference between the target rear-wheel braking force and the total braking force as the target front-wheel braking force. In other words, the target front-wheel braking force can be calculated by subtracting the target rear-wheel braking force from the total braking force. After the target rear-wheel braking force is calculated in S25, the processing returns to START via RETURN, followed by a repetition of the processing in and after S21. In this case, the ESC 33 controls the opening degrees of the control valves 41, 41', 42, and 42', thereby controlling the fluid amount of the brake fluid to supply from the master cylinder 9 to the wheel cylinders 4L, 4R, 5L, and 5R and thus distributing the braking force, so as to realize the calculated target rear-wheel braking force and target front-wheel braking force.

Figure 8:
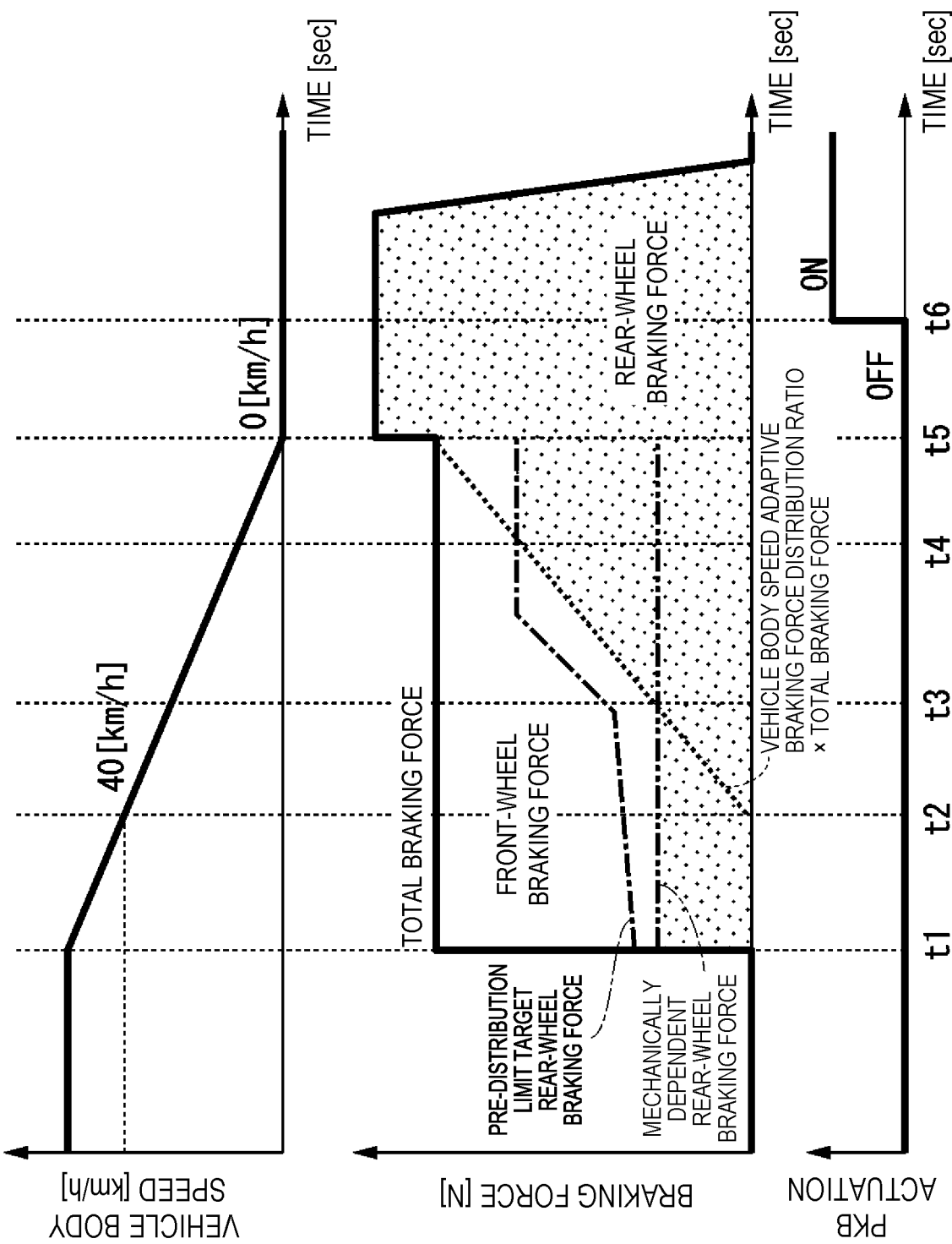
FIG. 8 illustrates characteristic lines indicating examples of changes in the vehicle body speed (the vehicle speed), braking forces, and actuation of a parking brake (PKB actuation) over time.

FIG. 8 illustrates the movement since the vehicle is decelerated and stopped while the braking force is distributed with use of the target rear-wheel braking force (and the target front-wheel braking force) calculated in the above-described processing until the parking brake is actuated in addition to that. For the braking force generated at time t1, the vehicle body speed adaptive braking force distribution ratio is zero and the mechanically dependent rear-wheel braking force is weaker than the pre-distribution limit target rear-wheel braking force. Therefore, the braking force is distributed to the front and rear wheels 2L, 2R, 3L, and 3R based on the mechanically dependent rear-wheel braking force. When the vehicle body speed reduces and it turns time t2, the vehicle body speed adaptive braking force distribution ratio starts increasing, and the value calculated by multiplying the total braking force by the vehicle body speed adaptive braking force distribution ratio exceeds the mechanically dependent rear-wheel braking force at time t3. Therefore, the distribution ratio of the braking force to the rear wheels 3L and 3R is increasing. Further, at time t4, the pre-distribution limit target rear-wheel braking force falls below the post-distribution processing target rear-wheel braking force. Therefore, the braking forces on the rear wheels 3L and 3R are limited by the pre-distribution limit target rear-wheel braking force.

When the vehicle is stopped at time t5, the pre-distribution limit target rear-wheel braking force increases and therefore the braking forces on the rear wheels 3L and 3R also increase. Because the distribution of the braking force to the rear wheels 3L and 3R increases by time t5, the change in the posture can be reduced when the parking brake is actuated at time t6. The parking brake is actuated, i.e., the parking mechanism 55 is driven by the ECU 35. The ECU 35 drives the electric motor of the parking mechanism 55 to the application side with the vehicle kept stopped due to the braking forces applied to the rear wheels 3L and 3R. The parking brake is actuated in this manner in reaction to the application instruction based on the operation on the parking brake switch 56 or the autonomous application instruction based on the control such as the autonomous driving and autonomous application.

In this manner, according to the embodiment, the ECU 35, which is the control apparatus that controls the parking mechanism 55, holds the braking force by driving the electric motor of the parking mechanism 55 with the braking force distributed only to the rear wheels 3L and 3R. In other words, the ECU 35 holds the braking force with the braking force distributed only to the rear wheels 3L and 3R, each of which is the wheel including the parking mechanism 55. This substantially eliminates the necessity of the operation for releasing the braking forces on the front wheels 2L and 2R, each of which is the wheel not including the parking mechanism 55. As a result, the embodiment can reduce the change in the posture of the vehicle accompanying the release of the braking forces on the front wheels 2L and 2R, each of which is the wheel not including the parking mechanism 55.

According to the embodiment, the ESC 33 as the braking force distribution apparatus increases the distribution of the braking force to the rear wheels 3L and 3R, each of which is the braking force holding wheel, according to a reduction in the speed of the vehicle body due to braking. This allows the braking force to be distributed to the rear wheels 3L and 3R and the front wheels 2L and 2R while preventing a reduction in the total braking force during braking. As a result, the embodiment can reduce the disturbance of the behavior of the vehicle accompanying braking and thus reduce the uncomfortable feeling due to this disturbance. Further, the ESC 33 distributes the braking force so as to allow the vehicle to be kept stopped due to the braking forces applied to the rear wheels 3L and 3R when the vehicle is stopped. Then, the ECU 35 as the parking brake control apparatus holds the braking force with the vehicle kept stopped due to the braking forces applied to the rear wheels 3L and 3R. Therefore, the embodiment can reduce the braking forces to release on the front wheels 2L and 2R after the vehicle is stopped, i.e., after the braking forces on the rear wheels 3L and 3R are held by the parking mechanism 55. In other words, the present configuration substantially eliminates the necessity of the operation for releasing the braking forces on the front wheels 2L and 2R. As a result, the embodiment can reduce the change in the posture accompanying the release of the braking forces on the front wheels 2L and 2R after the vehicle is stopped, i.e., the braking forces on the rear wheels 3L and 3R are held by the ECU 35.

According to the embodiment, the ESC 33 sets the maximum braking force distribution ratio of the rear wheels 3L and 3R according to the slip amount of the rear wheels 3L and 3R. In other words, the maximum braking force on the rear wheels 3L and 3R are limited according to the slip amount of the rear wheels 3L and 3R. Therefore, the embodiment can also reduce the disturbance of the behavior of the vehicle accompanying braking from this viewpoint. Further, the ESC 33 reduces the distribution of the braking force to the front wheels 2L and 2R as the vehicle speed reduces due to braking. In other words, the distribution of the braking force to the front wheels 2L and 2R reduces according to an increase in the distribution of the braking force to the rear wheels 3L and 3R, when the vehicle is stopped. Therefore, the braking force distribution apparatus can smoothly distribute the braking force so as to allow the vehicle to be kept stopped due to the braking forces applied to the rear wheels 3L and 3R when the vehicle is stopped.

According to the embodiment, the ESC 33 sets the distribution of the braking force to the front wheels 2L and 2R to almost zero when the vehicle is stopped. Therefore, the embodiment can reduce the braking forces on the front wheels 2L and 2R to almost zero when the vehicle is stopped. Further, the ESC 33 increases the distribution of the braking force to the rear wheels 3L and 3R according to a reduction in the speed of the vehicle due to braking at the time of the braking independent of the operation on the brake pedal 7. Therefore, the embodiment can distribute the braking force according to a reduction in the speed of the vehicle during the autonomous braking independent of the driver's operation. Further, the ESC 33 distributes the braking force so as to allow the vehicle to be kept stopped due to the braking forces applied to the rear wheels 3L and 3R when the vehicle is stopped at the time of the braking independent of the operation on the brake pedal 7. Therefore, the embodiment can keep the vehicle stopped due to the braking forces applied to the rear wheels 3L and 3R when the vehicle is stopped by the autonomous braking independent of the driver's operation. Further, the braking force is distributed by the control of the fluid amount by the ESC, which is the braking force distribution apparatus. Therefore, the braking force can be distributed by the control of the fluid amount by the ESC.

The embodiment has been described citing the example in which the ESC 33 sets the maximum braking force distribution ratio of the rear wheels 3L and 3R according to the slip amount of the rear wheels 3L and 3R, i.e., sets the maximum braking force distribution ratio according to the slip amount of the rear wheels 3L and 3R, each of which is the braking force holding wheel. However, the configuration is not limited thereto, and the braking force distribution apparatus may set the maximum braking force distribution ratio of the braking fore holding wheel according to, for example, an inclination state of the vehicle. More specifically, the braking force distribution apparatus may set the maximum braking force distribution ratio according to the inclination state of the vehicle (the vertical inclination of the vehicle or the slope of the road surface on which the vehicle runs). In this case, the maximum braking force on the braking force holding wheel is limited according to the inclination state of the vehicle. Therefore, the braking force distribution apparatus can distribute the braking force according to the acceleration (the deceleration) of the vehicle and the inclination state of the vehicle at that time while separating the acceleration (the deceleration) of the vehicle and the inclination state of the vehicle. As a result, the behavior of the vehicle accompanying braking can also be less disturbed from this viewpoint.

In the embodiment, the braking force distribution apparatus distributes the braking force at the time of the braking based on the driver's operation on the brake pedal 7 and/or the autonomous braking independent of the operation on the brake pedal 7. For example, the braking force distribution apparatus can be configured to distribute the braking force at the time of any type of braking regardless of whether the vehicle is braked based on the driver's operation on the brake pedal 7. Alternatively, the braking force distribution apparatus can be configured to distribute the braking force only at the time of the braking based on the driver's operation on the brake pedal 7. Alternatively, the braking force distribution apparatus can be configured to distribute the braking force only at the time of the autonomous braking independent of the operation on the brake pedal 7. The autonomous braking can be conducted by, for example, driving the electric motor 22 of the electric boosting apparatus 17. More specifically, the autonomously braking can be conducted by driving the electric motor 22 of the electric boosting apparatus 17 to generate the brake hydraulic pressure in the master cylinder 9. In this case, the braking force can be distributed by generating the brake hydraulic pressure using the electric boosting apparatus 17 and controlling the opening and closing of the control valves 40, 40', 41, 41', 42, 42', 45, 45', 46, 46', 53, and 53' of the ESC 33. Alternatively, the autonomous braking can also be conducted by driving the hydraulic pressure pumps 47 and 47' of the ESC 33. In this case, the braking force can be distributed by generating the brake hydraulic pressure using the hydraulic pressure pumps 47 and 47' of the ESC 33 and controlling the opening and closing of the control valves 40, 40', 41, 41', 42, 42', 45, 45', 46, 46', 53, and 53' of the ESC 33.

The embodiment has been described citing the example in which the vehicle is configured in such a manner that the electric boosting apparatus 17 is used as a main braking apparatus that generates the brake hydraulic pressure, the ESC 33 is used as an auxiliary braking apparatus that distributes the braking force, and, further, the parking brake is actuated by the parking mechanism 55. However, the configuration is not limited thereto, and another boosting apparatus such as a pneumatic boosting apparatus may be used as the main braking apparatus because the braking force can be distributed by the ESC 33. In the case where the pneumatic boosting apparatus is used, the autonomous braking can be conducted by, for example, driving the hydraulic pressure pumps 47 and 47' of the ESC 33. Further, the braking force distributed to the front and rear wheels may be applied using electric brakes for the front and rear wheels (each of the wheels) instead of combining the main braking apparatus and the auxiliary braking apparatus. More specifically, the braking force distribution apparatus may be configured to distribute the braking force by controlling an electric mechanism of an electric brake that presses a braking member (for example, pads or shoes) against a braking receiving member (for example, a disk rotor or a drum) by driving this electric motor (an electric motor or an electric actuator). In this case, the braking force can be distributed by controlling the electric mechanism of the electric brake. Further, a manual parking brake capable of holding the braking force by the driver's operating a lever thereof may be used as the parking brake.

The embodiment has been described citing the example in which the hydraulic pressure brakes are used as the brakes on all of the four wheels. However, the configuration is not limited thereto, and the vehicle may include electric brakes or hydraulic brakes as the two rear wheels together with including hydraulic brakes or electric brakes as the two front wheels besides being able to include electric brakes as the brakes of all of the four wheels.

The embodiment has been described citing the example in which the braking force is held by the parking mechanism 55 with almost zero braking forces distributed to the front wheels 2L and 2R, each of which is the non-braking force holding wheel. However, the configuration is not limited thereto, and, for example, the braking force distribution apparatus may distribute the braking force to the non-braking force holding wheel within a range capable of reducing the change in the posture of the vehicle accompanying the release of the non-braking force holding wheel. Then, the braking force may be held by the braking force holding mechanism in this state.

The embodiment has been described citing the example in which the rear wheels 3L and 3R correspond to the wheel including the parking mechanism 55, which is the braking force holding mechanism, and the front wheels 2L and 2R correspond to the wheel not including the parking mechanism 55. However, the configuration is not limited thereto, and, for example, the vehicle may be configured in such a manner that the front wheel corresponds to the wheel including the braking force holding mechanism and the rear wheel corresponds to the wheel not including the braking force holding mechanism.

Possible configurations as the brake system, the braking force distribution apparatus, and the electric brake apparatus based on the above-described embodiment include the following examples.

As a first configuration, a brake system includes a braking force distribution apparatus configured to distribute a braking force to apply to a braking force holding wheel and a non-braking force holding wheel of a vehicle. The vehicle includes the braking force holding wheel including a braking force holding mechanism configured to hold a braking force on the vehicle, and the non-braking force holding wheel not including this braking force holding mechanism. The brake system further includes a parking brake control apparatus configured to control actuation of the braking force holding mechanism. The braking force distribution apparatus increases distribution of the braking force to the braking force holding wheel according to a reduction in a speed of the vehicle due to braking, and distributes the braking force so as to allow the vehicle to be kept stopped due to the braking force applied to the braking force holding wheel when the vehicle is stopped. The parking brake control apparatus holds the braking force with the vehicle kept stopped due to the braking force applied to the braking force holding wheel.

According to this first configuration, the braking force distribution apparatus increases the distribution of the braking force to the braking force holding wheel according to the reduction in the speed of the vehicle due to the braking. This allows the braking force to be distributed to the braking force holding wheel and the non-braking force holding wheel while preventing the reduction in the total braking force during the braking. As a result, the brake system can reduce the disturbance of the behavior of the vehicle accompanying the braking and thus reduce the uncomfortable feeling due to this disturbance. Further, the parking brake control apparatus holds the braking force with the vehicle kept stopped due to the braking force applied to the braking force holding wheel. Therefore, the brake system can reduce the braking force to release on the non-braking force holding wheel after holding the braking force on the braking force holding wheel by the braking force holding mechanism In other words, the present configuration substantially eliminates the necessity of the operation for releasing the braking force on the non-braking force holding wheel. As a result, the brake system can reduce the change in the posture of the vehicle accompanying the release of the braking force on the non-braking force holding wheel after holding the braking force on the braking force holding wheel by the parking brake control apparatus.

As a second configuration, in the first configuration, the braking force distribution apparatus sets a maximum braking force distribution ratio of the braking force holding wheel according to a slip amount of the braking force holding wheel. According to this second configuration, a maximum braking force on the braking force holding wheel is limited according to the slip amount of the braking force holding wheel. Therefore, the brake system can also reduce the disturbance of the behavior of the vehicle accompanying the braking from this viewpoint.

As a third configuration, in the first or second configuration, the braking force distribution apparatus reduces distribution of the braking force to the non-braking force holding wheel according to the reduction in the speed of the vehicle due to the braking. According to this third configuration, the distribution of the braking force to the non-braking force holding wheel reduces according to the increase in the distribution of the braking force to the braking force holding wheel when the vehicle is stopped. Therefore, the braking force can be smoothly distributed so as to allow the vehicle to be kept stopped due to the braking force applied to the braking force holding wheel when the vehicle is stopped.

As a fourth configuration, in any of the first to third configurations, the braking force distribution apparatus sets the maximum braking force distribution ratio of the braking force holding wheel according to an inclination state of the vehicle. According to this fourth configuration, the maximum braking force on the braking force holding wheel is limited according to the inclination state of the vehicle. Therefore, the braking force can be distributed according to the acceleration (the deceleration) of the vehicle and the inclination state of the vehicle at that time while separating the acceleration (the deceleration) of the vehicle and the inclination state of the vehicle. Then, the brake system can also reduce the disturbance of the behavior of the vehicle accompanying the braking from this viewpoint.

As a fifth configuration, in any of the first to fourth configurations, the braking force distribution apparatus sets the distribution of the braking force to the non-braking force holding wheel to almost zero when the vehicle is stopped. According to this fifth configuration, the braking force on the non-braking force holding wheel can be reduced to almost zero when the vehicle is stopped.

As a sixth configuration, in any of the first to fifth configurations, the braking force distribution apparatus increases the distribution of the braking force to the braking force holding wheel according to the reduction in the speed of the vehicle due to the braking at the time of braking independent of an operation on a brake pedal. According to this sixth configuration, the braking force can be distributed according to the reduction in the speed of the vehicle during the autonomous braking independent of the driver's operation.

As a seventh configuration, in any of the first to sixth configurations, the braking force distribution apparatus distributes the braking force so as to allow the vehicle to be kept stopped due to the braking force applied to the braking force holding wheel when the vehicle is stopped at the time of the braking independent of the operation on the brake pedal. According to this seventh configuration, the vehicle can be kept stopped due to the braking force applied to the braking force holding wheel when the vehicle is stopped by the autonomous braking independent of the driver's operation.

As an eighth configuration, in any of the first to seventh configurations, the braking force distribution apparatus distributes the braking force by controlling a fluid amount of an ESC. According to this eighth configuration, the braking force can be distributed by the control of the fluid amount by the ESC.

As a ninth configuration, in any of the first to seventh configurations, the braking force distribution apparatus distributes the braking force by controlling an electric mechanism of an electric brake configured to press a braking member against a braking receiving member by driving this electric mechanism. According to this ninth configuration, the braking force can be distributed by controlling the electric mechanism of the electric brake.

As a tenth configuration, a braking force distribution apparatus is configured to distribute a braking force to apply to a braking force holding wheel and a non-braking force holding wheel of a vehicle. The vehicle includes the braking force holding wheel including a braking force holding mechanism configured to hold a braking force on the vehicle, and the non-braking force holding wheel not including this braking force holding mechanism. The braking force distribution apparatus is configured to increase distribution of the braking force to the braking force holding wheel according to a reduction in a speed of the vehicle due to braking, and distribute the braking force so as to allow the vehicle to be kept stopped due to the braking force applied to the braking force holding wheel when the vehicle is stopped.

According to this tenth configuration, the braking force distribution apparatus increases the distribution of the braking force to the braking force holding wheel according to the reduction in the speed of the vehicle due to the braking. This allows the braking force to be distributed to the braking force holding wheel and the non-braking force holding wheel while preventing the reduction in the total braking force during the braking. As a result, the brake force distribution apparatus can reduce the disturbance of the behavior of the vehicle accompanying the braking and thus reduce the uncomfortable feeling due to this disturbance. Further, the braking force is distributed so as to allow the vehicle to be kept stopped due to the braking force applied to the braking force holding wheel when the vehicle is stopped. Therefore, the braking force distribution apparatus can reduce the braking force to release on the non-braking force holding wheel after the vehicle is stopped. In other words, the present configuration substantially eliminates the necessity of the operation for releasing the braking force on the non-braking force holding wheel. As a result, the braking force distribution apparatus can reduce the change in the posture of the vehicle accompanying the release of the braking force on the non-braking force holding wheel after the vehicle is stopped.

As an eleventh configuration, in the tenth configuration, the braking force distribution apparatus reduces distribution of the braking force to the non-braking force holding wheel according to the reduction in the speed of the vehicle due to the braking. According to this eleventh configuration, the distribution of the braking force to the non-braking force holding wheel reduces according to the increase in the distribution of the braking force to the braking force holding wheel when the vehicle is stopped. Therefore, the braking force can be smoothly distributed so as to allow the vehicle to be kept stopped due to the braking force applied to the braking force holding wheel when the vehicle is stopped.

As a twelfth configuration, in the tenth or eleventh configuration, the braking force distribution apparatus sets the distribution of the braking force to the non-braking force holding wheel to almost zero when the vehicle is stopped. According to this twelfth configuration, the braking force on the non-braking force holding wheel can be reduced to almost zero when the vehicle is stopped.

As a thirteenth configuration, an electric brake apparatus includes an electric motor configured to drive a braking force holding mechanism configured to hold a braking force on a vehicle, and a control apparatus configured to control driving of the electric motor. The control apparatus holds the braking force by driving the electric motor with the braking force distributed only to a wheel including the braking force holding mechanism.

According to this thirteenth configuration, the braking force is held with the braking force distributed only to the wheel including the braking force holding mechanism. This substantially eliminates the necessity of the operation for releasing the braking force on the wheel not including the braking force holding mechanism. As a result, the electric brake apparatus can reduce the change in the posture of the vehicle accompanying the release of the braking force on the wheel not including the braking force holding mechanism.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-099437 filed on May 28, 2019. The entire disclosure of Japanese Patent Application No. 2019-099437 filed on May 28, 2019 including the specification, the claims, the drawings, and the abstract is incorporated herein by reference in its entirety.

REFERENCE SIGNS LIST 2L, 2R front left or right wheel (non-braking force holding wheel)
3L, 3R rear left or right wheel (braking force holding wheel)
7 brake pedal
33 hydraulic pressure supply apparatus (braking force distribution apparatus or ESC)
35 second ECU (parking brake control apparatus or control apparatus)
55 parking mechanism (braking force holding mechanism)

The invention claimed is:

1. A brake system comprising:
a braking force distribution apparatus configured to distribute a braking force to apply to a braking force holding wheel and a non-braking force holding wheel of a vehicle, the vehicle including the braking force holding wheel including a braking force holding mechanism configured to hold a braking force on the vehicle and the non-braking force holding wheel not including this braking force holding mechanism; and
a parking brake control apparatus configured to control actuation of the braking force holding mechanism,
wherein the braking force distribution apparatus increases distribution of the braking force to the braking force holding wheel according to a reduction in a speed of the vehicle due to braking, and distributes the braking force so as to allow the vehicle to be kept stopped due to the braking force applied to the braking force holding wheel when the vehicle is stopped, and
wherein the parking brake control apparatus holds the braking force with the vehicle kept stopped due to the braking force applied to the braking force holding wheel.

2. The brake system according to claim 1, wherein the braking force distribution apparatus sets a maximum braking force distribution ratio of the braking force holding wheel according to a slip amount of the braking force holding wheel.

3. The brake system according to claim 1, wherein the braking force distribution apparatus reduces distribution of the braking force to the non-braking force holding wheel according to the reduction in the speed of the vehicle due to the braking.

4. The brake system according to claim 1, wherein the braking force distribution apparatus sets the maximum braking force distribution ratio of the braking force holding wheel according to an inclination state of the vehicle.

5. The brake system according to claim 1, wherein the braking force distribution apparatus sets the distribution of the braking force to the non-braking force holding wheel to almost zero when the vehicle is stopped.

6. The brake system according to claim 1, wherein the braking force distribution apparatus increases the distribution of the braking force to the braking force holding wheel according to the reduction in the speed of the vehicle due to the braking at the time of braking independent of an operation on a brake pedal.

7. The brake system according to claim 1, wherein the braking force distribution apparatus distributes the braking force so as to allow the vehicle to be kept stopped due to a braking force applied to the braking force holding wheel when the vehicle is stopped at the time of the braking independent of the operation on the brake pedal.

8. The brake system according to claim 1, wherein the braking force distribution apparatus distributes the braking force by controlling a fluid amount of an ESC.

9. The brake system according to claim 1, wherein the braking force distribution apparatus distributes the braking force by controlling an electric mechanism of an electric brake, the electric brake being configured to press a braking member against a braking receiving member by driving this electric mechanism.

10. A braking force distribution apparatus,
the braking force distribution apparatus being configured to distribute a braking force to apply to a braking force holding wheel and a non-braking force holding wheel of a vehicle, the vehicle including the braking force holding wheel including a braking force holding mechanism configured to hold a braking force on the vehicle and the non-braking force holding wheel not including this braking force holding mechanism, and the braking force distribution apparatus being configured to increase distribution of the braking force to the braking force holding wheel according to a reduction in a speed of the vehicle due to braking, and distribute the braking force so as to allow the vehicle to be kept stopped due to the braking force applied to the braking force holding wheel when the vehicle is stopped.

11. The braking force distribution apparatus according to claim 10, wherein the braking force distribution apparatus reduces distribution of the braking force to the non-braking force holding wheel according to the reduction in the speed of the vehicle due to the braking.

12. The braking force distribution apparatus according to claim 10, wherein the braking force distribution apparatus sets the distribution of the braking force to the non-braking force holding wheel to almost zero when the vehicle is stopped.

* * * * *